(12) United States Patent
Kasubke

(10) Patent No.: US 7,686,335 B2
(45) Date of Patent: Mar. 30, 2010

(54) OVER-ROLL PROTECTION SYSTEM FOR A VEHICLE

(75) Inventor: Wolfgang Kasubke, Georgsmarienhütte (DE)

(73) Assignee: Wilhelm Karmann GmbH i.I., Osnabrueck ( * ) Notice: Subject to any disclaimer, the term of this patent is extended or adjusted under 35 U.S.C. 154(b) by 813 days.

(21) Appl. No.: 11/425,896

(22) Filed: Jun. 22, 2006

(65) Prior Publication Data
US 2006/0290124 A1  Dec. 28, 2006

(30) Foreign Application Priority Data
Jun. 23, 2005  (DE) .................. 10 2005 029 253

(51) Int. Cl.
*B60R 21/13* (2006.01)
(52) U.S. Cl. ........................ 280/756; 180/282
(58) Field of Classification Search ............ 296/190.03; 280/756; 180/282; 297/216.12, 216.13
See application file for complete search history.

(56) References Cited

U.S. PATENT DOCUMENTS

| | | | |
|---|---|---|---|
| 5,094,478 A * | 3/1992 | Pfanzeder et al. ........... | 280/756 |
| 5,224,735 A * | 7/1993 | Jambor et al. ............... | 280/756 |

FOREIGN PATENT DOCUMENTS

| | | |
|---|---|---|
| DE | 43 14 538 | 11/1994 |
| DE | 195 01 522 | 8/1995 |
| DE | 195 01 584 | 7/1996 |
| DE | 195 40 819 | 5/1997 |
| DE | 197 12 955 | 10/1998 |
| DE | 197 50 457 A1 * | 6/1999 |
| DE | 198 38 989 | 11/1999 |
| DE | 103 18076 A1 * | 11/2004 |
| DE | 103 57 053 | 2/2005 |
| EP | 1 084 914 | 3/2001 |
| JP | 7-164985 A * | 6/1995 |

* cited by examiner

*Primary Examiner*—Ruth Ilan
(74) *Attorney, Agent, or Firm*—Quinn Law Group, PLLC

(57) ABSTRACT

A rollover protection system with at least one rollover protection device allocated to a vehicle seat consists of a first module attached to the body with guide devices for a second module, movable between a lowered rest position and an elevated support position, with a rollover element, a releasable holding device for holding the second module in its rest position, a locking device, by means of which the second module can be automatically supported in a position deviating from its rest position against a force acting in the direction of the rest position, and a drive system with a spring-force accumulator, by means of which the second module, as required, can be moved in the direction of its support position. In a design that permits a pass-through opening, the rollover protection devices of two vehicle seats in a row of seats are arranged in opposite directions, essentially off-center relative to the corresponding vehicle seat.

30 Claims, 22 Drawing Sheets

OVER-ROLL PROTECTION SYSTEM FOR A VEHICLE

CROSS-REFERENCE TO RELATED APPLICATIONS

This application claims priority to German Patent Application No. DE 10 2005 029 253, filed on Jun. 22, 2005.

TECHNICAL FIELD

The invention relates to a protection system for a vehicle, especially a cabriolet vehicle.

BACKGROUND OF THE INVENTION

In passenger cars, as well as tractors, it is known to provide a rollover protection system to create a survival space for occupants in the event of vehicle rollover, having a rollover bar, for example, which is allocated to an individual vehicle seat or several vehicle seats and is concealed in its rest position in a cassette attached to the vehicle, from which it can be abruptly moved into an upper support position and locked in this support position on recognition of a vehicle accident.

Rollover bars generally used in practice typically consist of a U-shaped bar, whose tubular arms are guided vertically in vertical tubes of a module attached to the vehicle. A coil spring is arranged in the interior of each arm, which is biased by a holding device that can be released as a function of a crash signal of the vehicle sensor mechanism, so that the rollover arm, under the influence of the spring, is deployed in tenths of a second and locked in its support position by an appropriate locking device. The two tubular arms are then connected to each other by a cross-yoke, over which a cushioned impact element is generally mounted.

Examples of rollover bars, deployable or pivotable outward in the event of a crash and extending over the entire width of the vehicle, are described in DE 195 40 819 C2 and DE 197 12 955 A1.

A problem with such rollover bars that span the entire width of the vehicle is that often a so-called drawer effect is observed, which is understood to mean a tilting or jamming of the rollover bar during its activation, because of manufacturing tolerances or a lack of synchronization of the drives acting on the arms of the bar.

DE 198 38 989 C1 is referred to as an example of a rollover protection device allocated to only one vehicle seat, with a rollover element that can be deployed independently of a rollover element that is allocated to another vehicle seat. In it, a rollover device is disclosed, consisting of a cassette that is fastened to the vehicle, a rollover element in the form of a profile bar element extending over the entire width of the cassette, secured and guided in guides and deployable in the cassette, a locking device for self-locking of the deployment movement and a spring drive system for deploying the profile bar element and with a mechanical holding device for holding the rollover element in a rest state against the bias force of the compression spring of the spring drive system.

The furnishing of such a rollover protection device for each vehicle seat disadvantageously causes a large number of components and overall high weight for the entire rollover protection system.

The rollover protection systems just described, like the rollover protection devices known from practice, also have the drawback that a pass-through capability between the vehicle spaces bordering the rollover protection device and its guide devices is often limited, owing to the drive of the rollover bar on both sides. The rollover protection devices, generally arranged in the center in a vehicle seat, therefore do not permit any pass-through or permit only a small-dimensioned pass-through between an occupant space and a stowage space on the rear of the vehicle, since only limited spacing is available between the rollover protection devices of the corresponding seats.

Even more limited are the capabilities for achieving a pass-through with rollover protection devices that are fastened as a standing unit on a mount attached to the body, for example, a vehicle transverse wall adjacent the rear of a vehicle seat.

This type of advantageous embodiment of a rollover protection device, from the standpoint of manufacture, is described, for example, in DE 195 01 584 C2, DE 43 14 538 C3 and EP 1 084 914 A2.

In addition, it is known from DE 195 01 522 A1 to arrange a support element in the two rear side wall areas of the vehicle body, when lowered in its rest position in the vehicle side wall area, and can automatically be moved into an active position in the event of an accident.

It is also known from DE 103 57 053 A1 to arrange deployable rollover bars in a driver's side or passenger's side door.

SUMMARY OF THE INVENTION

A rollover protection system with at least one rollover protection device assigned to a vehicle seat is therefore provided, which has a first module attached to the vehicle with guide devices for a second module with a rollover element, movable between a lowered rest position and an elevated support position, in which a releasable holding device for holding the second module in its rest position, a locking device to support the second module in a position deviating from its rest position, and a drive system with a spring-force accumulator, by means of which the second module is biased from the rest position to the support position, are provided.

The rollover protection devices of two vehicle seats of a row of seats are each arranged in an opposite direction, essentially off-center in an outboard direction relative to the corresponding vehicle seat.

In addition, in such a rollover protection system, the rollover element may be bar-like within which there is defined an axial receiving channel for the spring force accumulator within. The guide device of the first module may have a tubular profile within which at least one upper end area in the rest position of the rollover element and one lower end area in the support position of the rollover element are accommodated.

The rollover protection system according to the invention therefore has a rollover protection device for each vehicle seat, which is driven independently of the rollover protection device for another seat, so that a tilting of the deployable module in its deployment movement, and therefore an adverse effect on the function and reliability or possibly additional required synchronization devices, can be avoided.

An off-center outboard arrangement of the rollover protection devices, i.e., the fact that their components are arranged primarily in the region of a side of the corresponding vehicle seat that faces a side of the vehicle, advantageously permits the arrangement of a sizable pass-through opening between the vehicle seats.

The bar-like configuration of the rollover element with an axial receiving channel for the spring force accumulator has the advantage that the spring force accumulator, which is required to move the rollover element, can be integrated into the rollover element, in which case an additional spring guide can be dispensed with by shaping the internal contour of the rollover element according to the shape of the spring force accumulator.

The spring force accumulator can then be designed as a compression spring, which is supported on the first module fastened to the body and the rollover element. Alternatively, a tension spring can also be provided, which is biased, for example, between a bar extending into the interior of the rollover element coaxial to it and the rollover element held by the releasable holding device, so that the rollover element, after release by the releasable holding device, is transferred to an upper support position by the tensile force of the spring.

In an embodiment without any guide rods, this type of tension spring can also be held on a pin attached to the body, which extends, for example, through a longitudinal slit into the interior of the rollover bar, so that the spring force accumulator is fully guided by the rollover element without an additional guide.

Complete guiding of the spring force accumulator by the rollover element is also possible with a compression spring, which is incorporated vertically under compression between a stop formed on the rollover element and a stop fixed to the body, extending through a recess in the rollover element, which can be designed, for example, as a pin with a spring retainer.

Because of this and the fact that the first module has a tube profile as the guide device for the rollover element, which profile, in the rest state of the rollover element, accommodates at least its upper end area and in the support position its lower area, a slim and compact design of the corresponding rollover protection device is achieved, which optionally together with the off-center arrangement of the rollover protection devices, for example, behind the rear seats, offers a large pass-through capability for bulky objects between a vehicle interior space and a rear stowage space.

For a further reduction of design space and weight, it can be prescribed, in an advantageous embodiment of the invention, that the tube profile that forms the guide device for the rollover element be arranged with its lower edge at a spacing relative to a foot element of the first module.

To connect the tube profile with the foot element of the first module, a connection fastened laterally to the tube profile may be provided, which, for example, can have a U-profile or a box profile.

The guide devices of the first module and elements of the deployable module, especially the rollover element, can be made from cost-effective extruded profiles.

The tubular guide device may be combined with additional functional elements, for example, with a catch device of the locking device, which can be supported on the tubular guide device.

In a cost-effective embodiment, the tubular guide device, for example, can have a peripheral recess to accommodate the catch device of the locking device supported thereon, in which the catch device is held in shape-mated fashion on the tube profile in the direction of movement of the rollover element and not further connected to the tubular guide device.

The rollover protection devices that can be positioned off-center behind the vehicle seats in a compact design and may be formed from preassembled component groups, which can be fastened to the vehicle structure.

The component group so formed from a first module, second module, holding device, locking device and drive system, can be inserted in a single assembly step into the prescribed vehicle body and then need only be connected to a cable harness of the vehicle. Triggering sensors for the rollover protection devices can then be integrated into the corresponding component group.

Fastening of the rollover protection devices to the vehicle structure can be accomplished, for example, by screwing to a vertical vehicle transverse wall behind the seats, or to mounts on the vehicle side, if the component group simultaneously forms the vehicle transverse wall with the rollover protection system.

In a simple embodiment, the stiffening in the vehicle transverse direction can be achieved by a simple transverse support that connects the rollover protection devices above a pass-through opening.

In a particularly compact embodiment of the rollover protection system according to the invention, a restraining belt system with safety belt guides for at least one safety belt can be integrated into the first module attached to the body.

The components of a safety belt system, like a belt winder and an upper safety belt guide, can be integrated without problem into the components of the rollover protection system attached to the vehicle via corresponding mounts, which can be provided without special expense in the production of the first module.

The restraining belt system can then include not only safety belts for buckling of adults, but also child safety seat restraining belts, in which, in a particularly advantageous embodiment, an upper anchoring point for a child safety seat belt, which is also referred to as top-tether fastening, can also be arranged on a component of the rollover protection system attached to the vehicle.

The rollover protection system according to the invention, in a particularly advantageous embodiment, can be designed, together with the rollover protection devices, and optionally a pass-through opening and a vehicle-stiffening transverse support, as a completely preassembled unit, so that this multifunctional assembly can be inserted as a single, preconfigured module during vehicle assembly into the body and fastened to it, for example, by screw connections.

Such a separately completed assembly, which is inserted into the vehicle during final assembly, can also include seat components, for example, an upper and lower seatback support.

The releasable holding device for holding the second module with the rollover element in its rest position, in an advantageous embodiment, can include a locking element mounted to pivot around a fixed axis of rotation, which is designed disk-like and has, in addition to a detent section, a peripheral recess, into which a blocking element of an actuator engages in the rest position, and a peripheral stop, against which the blocking element, retracted by the actuator from the recess to transfer the second module into its support position, lies after rotation of the locking element that disengages the detent section from the locking element/mating element.

This configuration of the releasable holding device of the rollover protection device permits a reliable and cost-effective locking of the rollover element in its rest position, in which the holding device can advantageously be implemented with few components and manufactured without high precision. The disk-like locking element then replaces the lever of a known double-lever system and can be mounted without a spring device relative to the blocking element of the actuator.

It can be prescribed in a simple embodiment that the blocking element can be moved linearly by the actuator in the axial direction, so that a configuration of the actuator, for example, as an electromagnetic or piezoelectric actuator that retracts the blocking element in its axial direction to release the rollover element is possible. The blocking element can then be a pin, biased by means of the spring against the locking element, or a plate element of simple design.

In an advantageous embodiment of the invention, the axis of rotation of the locking element is formed via a pin that is mounted on the opposite sides of a base element, in which the sides of the base element are connected to each other by a cross-arm, which forms a seat for the actuator. The base element therefore represents a sort of cage for the releasable holding device, with which the holding device can be arranged on any elements of the rollover protection system attached to the body.

In a particularly simple embodiment, the base element can be designed essentially as a U-profile, in which the side arms of the U-profile form the sides of the base element.

Another advantageous embodiment of the rollover protection system according to the invention proposes that the pivotable locking element, which engages with a mating element of the second module in the rest position of the rollover element and releases the rollover element for transfer into its support position in the event of a crash, is secured in the rest position by a fusible insert of the actuator that can be melted in the event of an accident.

The use of a fusible insert to hold a locking element and to eliminate the locking position in the event of a crash simply and cost-effectively enables reliable and rapid release of the rollover element.

If only the locking element, engaged with the mating element and mounted to pivot in the rest position of the rollover element, need be held by the fusible insert, the fusible insert can be designed for much lower forces than would be necessary for direct holding of the second module or rollover element. The correspondingly reduced dimensioning of the fusible insert again permits rapid melting and therefore severing of the components connected to it, so that release of the rollover element can occur in a very short time.

The fusible insert, in principle, can have any shape and can be designed, for example, plate-like, rod-like, or wire-like.

The pivotable locking element can also be configured, in principle, in any shape in the holding device of the rollover protection system in accordance with the present invention.

In an advantageous embodiment of the invention, a blocking element can be arranged between the locking element and the actuator. It can then be prescribed that the blocking element in the blocked position be biased with an energy accumulator against a seat held by the meltable fusible insert of the actuator. When an accident is recognized, the seat of the blocking element can be instantaneously eliminated by melting of the fusible insert, so that the biased blocking element can escape in the direction of the eliminated seat and release the locking element. The energy accumulator can be designed as a spring, which is supported on one end by a spring seat formed on the blocking element and on the other end on a housing-like base element.

In order to keep the blocking element from falling out after elimination of the seat and in order to facilitate the reversibility of triggering of the holding device, a blocking element stop can be provided on the base element to limit the path of the blocking element after release of the seat in the event of a crash in a direction facing away from the locking element.

The seat of the blocking element in the blocking position can be formed by at least two pivotably mounted jaw elements, which are connected by a fusible insert. The connection between the jaw elements is therefore eliminated in the event of a crash, so that they can be pivoted from each other by the action of the blocking element.

In an embodiment without a separate blocking element, the locking element can be forced radially against a seat, which is held in the rest position of the system by a meltable fusible insert. When, on the other hand, the tensile force of the biased rollover element or a bias element acts on the locking element in the direction of rotation, a rotational movement of the locking element that releases the holding device is permitted by eliminating the seat as a result of melting of the fusible insert.

In another advantageous embodiment, the locking element can be connected in the rest position radially in the direction of rotation to a base element by a fusible insert such that it exerts a tensile force relative to the base element, in which the base element carries one end of the fusible insert and the locking element the other end of the fusible insert.

In another advantageous embodiment of the invention, the locking element in the rest position can also be held in a stop position, from which it can be transferred to a rotation position, in the event of a crash, by an actuator with a pyrotechnic propellant charge.

The described embodiments of a releasable holding device permit a reliable and cost-effective blocking of the rollover element in its rest position, in which the holding device can advantageously be made with few components and manufactured without high precision.

The locking device, in a rollover protection device designed according to the invention, has at least a first catch device, which can be brought into effective connection with a second catch device to support the second module, and which permits movement of the second module, starting from its rest position, in the direction of its support position. The first catch device, in a simple embodiment, can have a detent with a tooth profile, whereas the second catch device is designed with a catch strip adapted to the geometry of the tooth profile of the first catch device. The detent is then preferably spring-loaded in the direction of the catch strip.

In another embodiment of the invention, the locking device can be designed for automatic locking of the deployable second module in its partially or fully deployed position with a first and second catch device, in which one of the catch devices is connected to one of the modules and has a blocking element mounted eccentrically around an axis of rotation designed with a tooth profile, and in which the other catch device is designed as a surface of the other module facing the blocking element, with which the tooth profile is in frictional engagement in an effective position of the blocking element, in which movement of the second module in the direction of its rest position is prevented.

A rollover protection system configured in this way has the advantage of a simple design with few components to be manufactured without high precision, so that, in comparison with the rollover protection systems known from the prior art, a cost-effective production is possible.

The second catch device can therefore be designed as a simple surface of a component of one of the modules, which is available without further manufacturing steps, whereas in ordinary rollover protection systems, costly catch devices made with tooth profiles are provided, which must be engaged with a tooth profile of a detent to lock the rollover protection system.

Further advantages and advantageous embodiments of a rollover protection system according to the invention can be deduced from the description, the drawing and the claims.

Several practical examples of a rollover protection system for a cabriolet vehicle according to the invention are shown in schematically simplified fashion in the drawing and are further explained in the following description, in which the same reference numbers are used for components of the same design and function in the interest of clarity.

DESCRIPTION OF THE PREFERRED EMBODIMENTS

Figure 1:
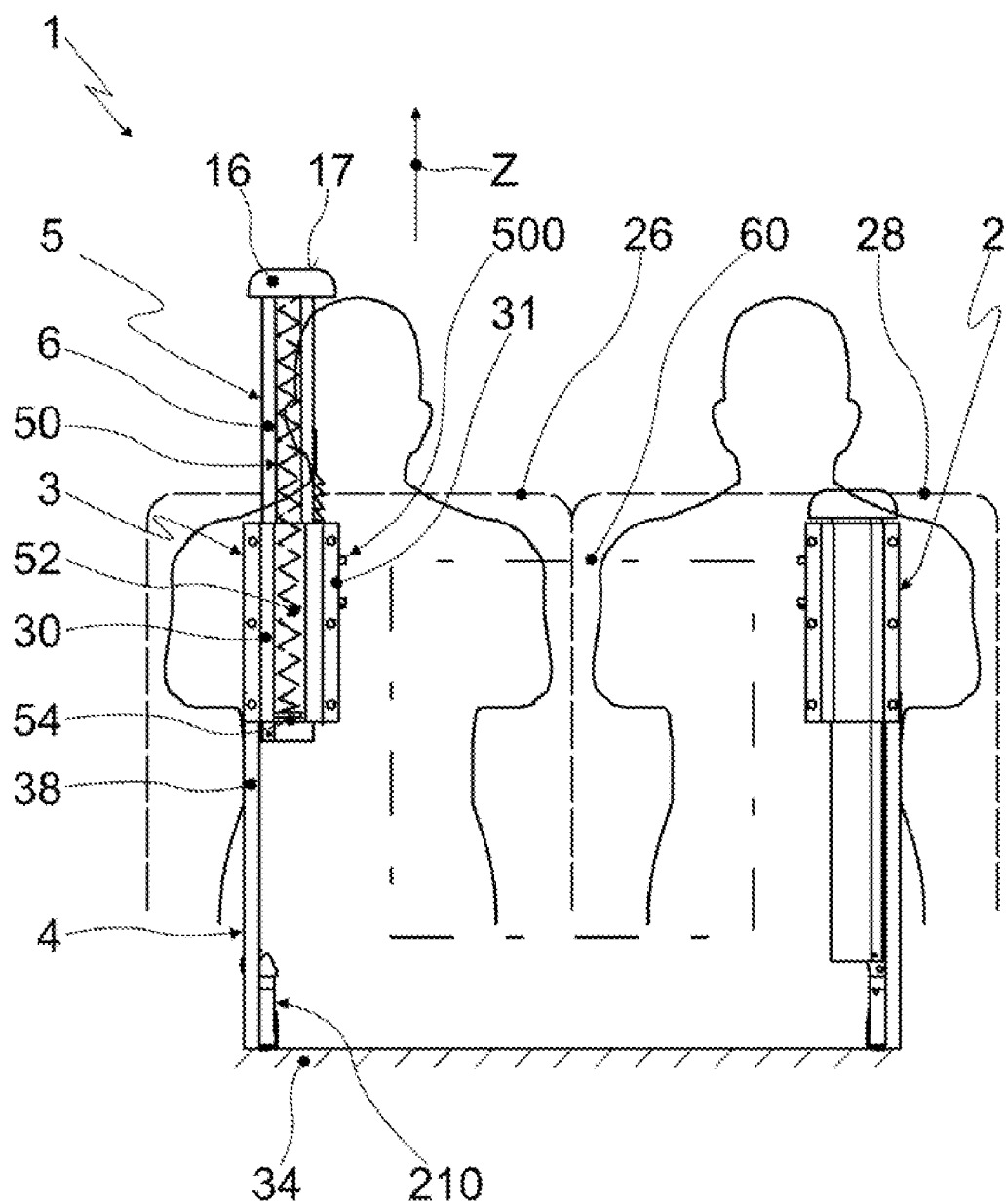
FIG. 1 is a schematic front view of a rollover protection system, in which a rollover protection device is allocated to each vehicle seat.

The figures of the drawings show, in a simplified depiction, a rollover protection system 1 for a cabriolet vehicle, from which two vehicle seats 26, 28 are schematically shown in FIG. 1. A rollover protection device 2 and 3 is allocated to each of the respective vehicle seats 26, 28, each of which has a first module 4 attached to the body and a second module 5 with a rollover element 6, movable between a lowered rest position and an elevated support position, in which the second module is translated or guided on the first module 4.

In addition, each rollover protection device 2, 3 has a releasable holding device 210, 310 or 410 to hold a second module 5 with the rollover element 6 in its rest position, a locking device 500 and 600, by means of which the second module 5 can be automatically supported in a position deviating from its rest position against a force acting in the direction of the rest position, and a drive system 50 with a spring force accumulator 52, by means of which the second module 5 is biased in its rest position and, as required, can be moved in the direction of its support position.

The rollover element 6, in all depicted embodiments, is of a bar-like design and has an axial receiving channel 8 for the spring force accumulator 52 in its interior.

The spring force accumulator 52 is shown partially symbolically in the figures and can be designed in the usual manner as a coil compression spring.

In the depicted embodiment, the rollover element 6 represents a straight bar element, although in other embodiments a curvature in its upper area can optionally be provided.

Figure 2:
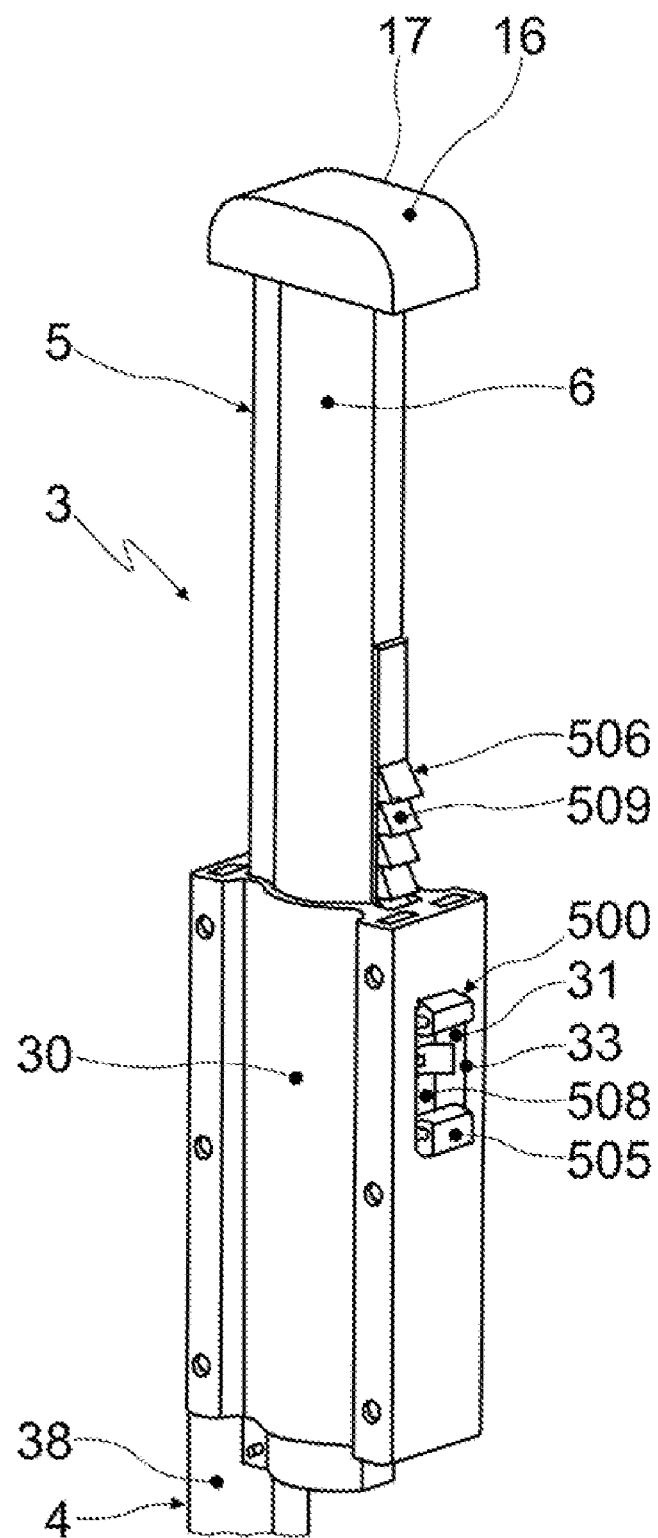
FIG. 2 is a perspective view of an upper area of a rollover protection device of FIG. 1.
Figure 8:
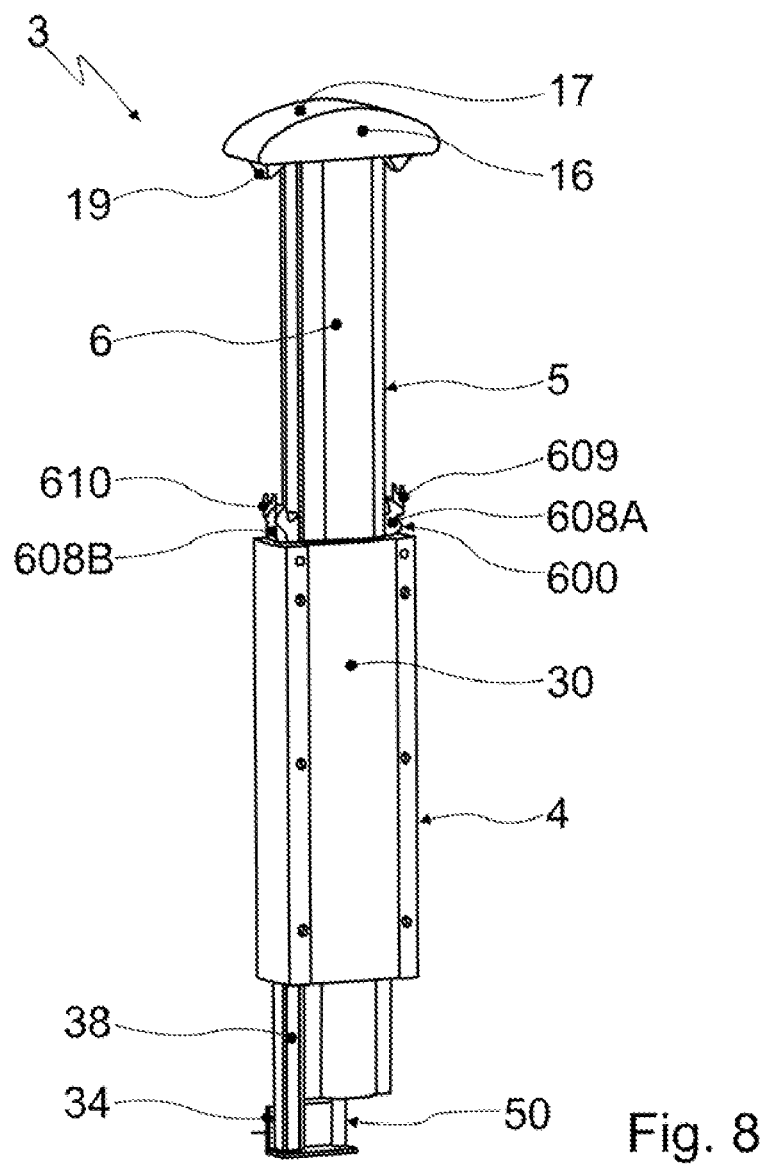
FIG. 8 is a perspective view of a rollover protection device, which corresponds essentially to the embodiment of the rollover protection device according to FIG. 1, but has an alternative holding device for the rollover element, an alternative locking device and an alternatively configured drive system.

The cross section of the rollover element 6 is essentially round, the internal cross-sectional contour in the embodiment according to FIG. 1 and FIG. 2 being circular and in the embodiment according to FIG. 8, oval. On the outer contour, flat spots 7 enclosing the round core cross section and connectors 10, 11, 12, 13, 14 and 15 are formed, in which the flat spots 7 and the connectors 11 to 15 serve not only for stiffening, but also prevention of rotation of the rollover element 6, and may be a component of the corresponding locking device 500, 600 of the rollover element 6.

In the embodiment according to FIG. 1, the compression spring 52, serving as a spring force accumulator, is held in the receiving channel 8 of the rollover element 6 and secured by a blocking pin 54, which is connected to a tubular guide device 30 of the first module 4. A slit-like passage opening 9 for the blocking pin 54, apparent in FIG. 3 and extending over the displacement zone of the rollover element 6, then ensures displaceability of the rollover element 6.

Alternatively, the receiving channel 8 for the spring force accumulator 52 in the rollover element 6 could also extend only over a shorter longitudinal section of the rollover element 6, and the spring force accumulator 52 could be supported on a foot part 34 of the first module 4, as is the case in the embodiment depicted, for example, in FIG. 8. In the embodiment according to FIG. 1, when additional support is desired for the spring force accumulator 52, its extension up to the foot part 34 of the first module 4 can therefore be prescribed, in which case the spring force accumulator 52 can optionally be arranged around a guide bar or on a bar.

In the embodiments according to FIG. 1 and FIG. 8, the tubular guide device 30, serving as the guide device of the rollover element 6, is arranged at a spacing with its lower edge relative to the foot element 34 of the first module 4, in which the tubular guide device 30, in the rest position of the rollover element 6, which is shown in FIG. 1 by means of the rollover protection device 2 depicted on the right, encloses an upper end area of the rollover element 6 and accommodates the lower end region of the rollover element 6 in the support position of the rollover element 6, which is shown in FIG. 1 on the left, with reference to rollover protection device 3.

Connection of the tubular guide device 30 to the foot element 34 of the module 4 occurs in the depicted embodiments via a connection 38, which is introduced on the side of the tubular guide device 30 facing the vehicle side and is screwed to it.

In the depicted embodiments, the connection is designed with an extruded profile, in which a U-cross-section is chosen, in the present case, for the connection 38. Alternatively, however, any other profile shape of an open or closed profile can be chosen for the connection 38 according to the present application, the choice of geometry being made with respect to the slimmest possible design of the rollover protection device 2 and 3.

In the present embodiments, the rollover protection devices 2, 3 are allocated to two vehicle seats 26, 28 of a row of seats, each in the opposite direction, essentially off-center relative to the corresponding vehicle seat 26 or 28, so that sufficient space is present between the rollover protection devices 2, 3 for a substantial pass-through opening 60, by means of which objects can be guided from a stowage space or trunk in the rear into the vehicle interior.

The pass-through opening 60 is only depicted schematically in FIG. 1 and can be adapted to the corresponding conditions with respect to size and geometry.

The rollover protection devices 2, 3 are each connected to a crash sensor mechanism of the vehicle, not further shown and designed in the usual manner, in which the holding device 210, 310 or 410 is driven by it, by means of which the rollover element 6 is held in the rest position against the force of the spring force accumulator 52.

In the presence of an accident signal, the corresponding holding device 210, 310, 410 releases the rollover element 6, so that the rollover element 6 is moved by the force of the spring force accumulator 52 into its deployed upper support position, in which it is secured by the locking device 500 or 600 against retraction.

In order to be able to better absorb the forces occurring during a vehicle rollover, the rollover element 6, on its upper end, has an impact profile 16 with an impact surface 17, enlarged relative to the cross-sectional surface of the rollover element 6. This impact profile 16, which prevents the bar-like rollover element from drilling into the ground during a vehicle rollover, is present, as shown, in particular, in FIG. 8a, as a hollow profile with several cavities, which has a curvature on its impact surface 17 facing away from the bottom of the body. The impact profile 16 is closed on the sides with base plates 20.

Figure 3:
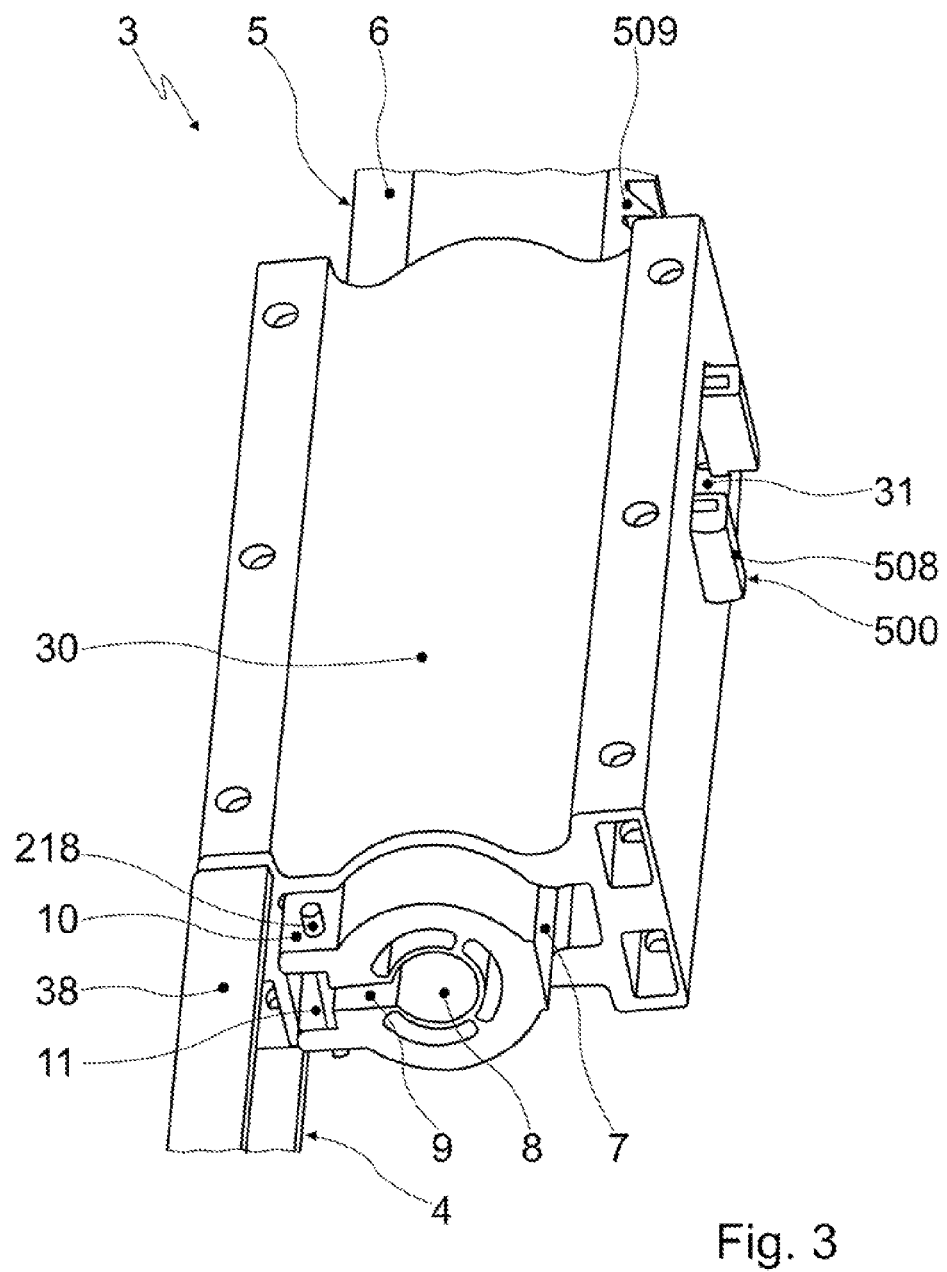
FIG. 3 is a partial perspective view of the upper area of the rollover protection device depicted in FIG. 2.

In order to limit the deployment movement of the rollover element 6, it has a mating element 218, such as a pin, readily apparent in FIG. 3, as a stop, which stops against a lower edge of the tubular guide device 30 when the maximum height position of the rollover element 6 is reached.

With this mating element 218, the rollover element 6 is simultaneously held in the rest state by the holding device 210 in the embodiment according to FIG. 1, so that an additional height stop can be omitted, because of the arrangement of the holding device 210 shown in it and the position of the mating element 218.

Figure 4:
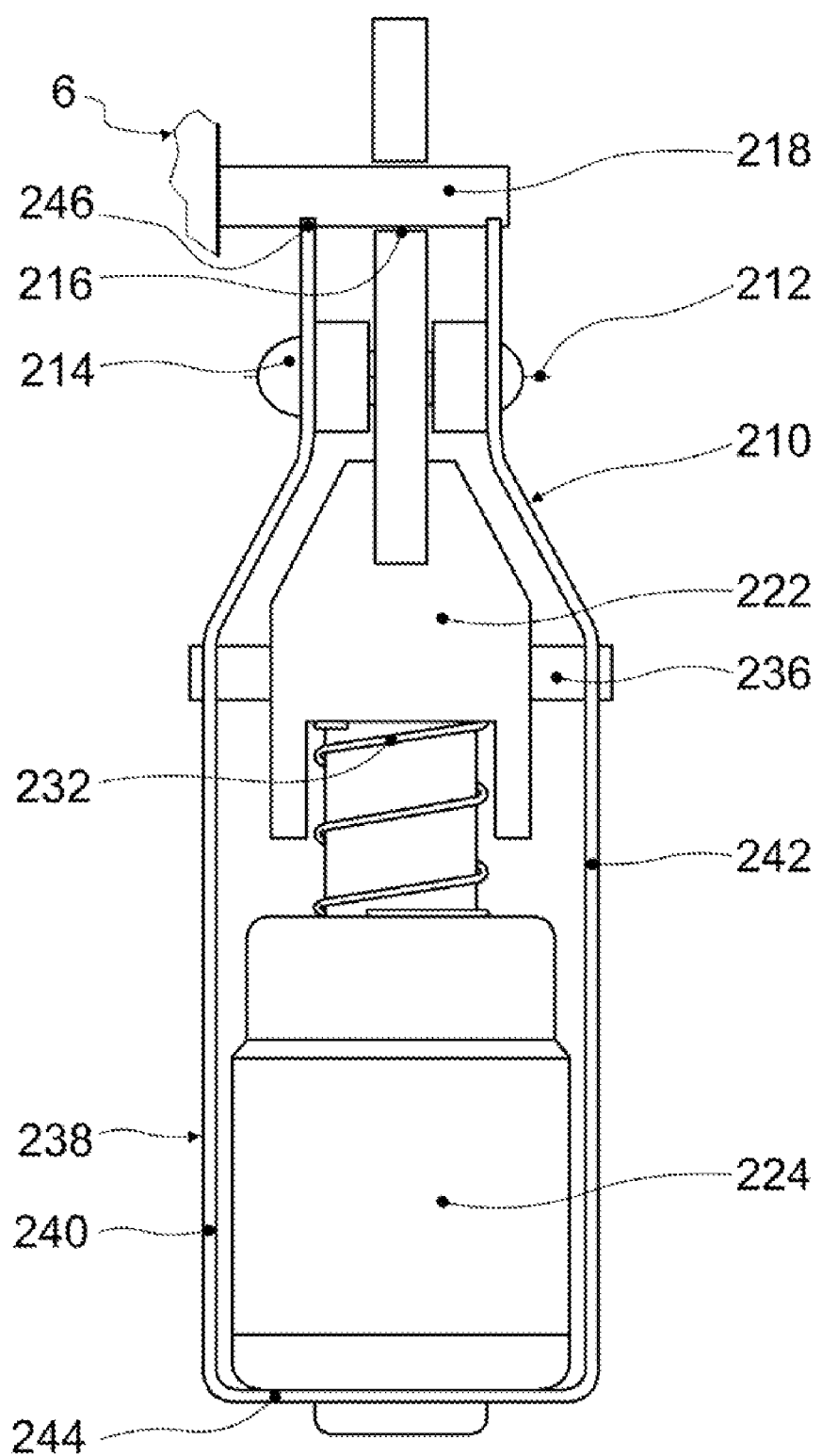
FIG. 4 is a front view of a holding device for a rollover element of the rollover protection device of FIG. 2 in a locked rest state.
Figure 5:
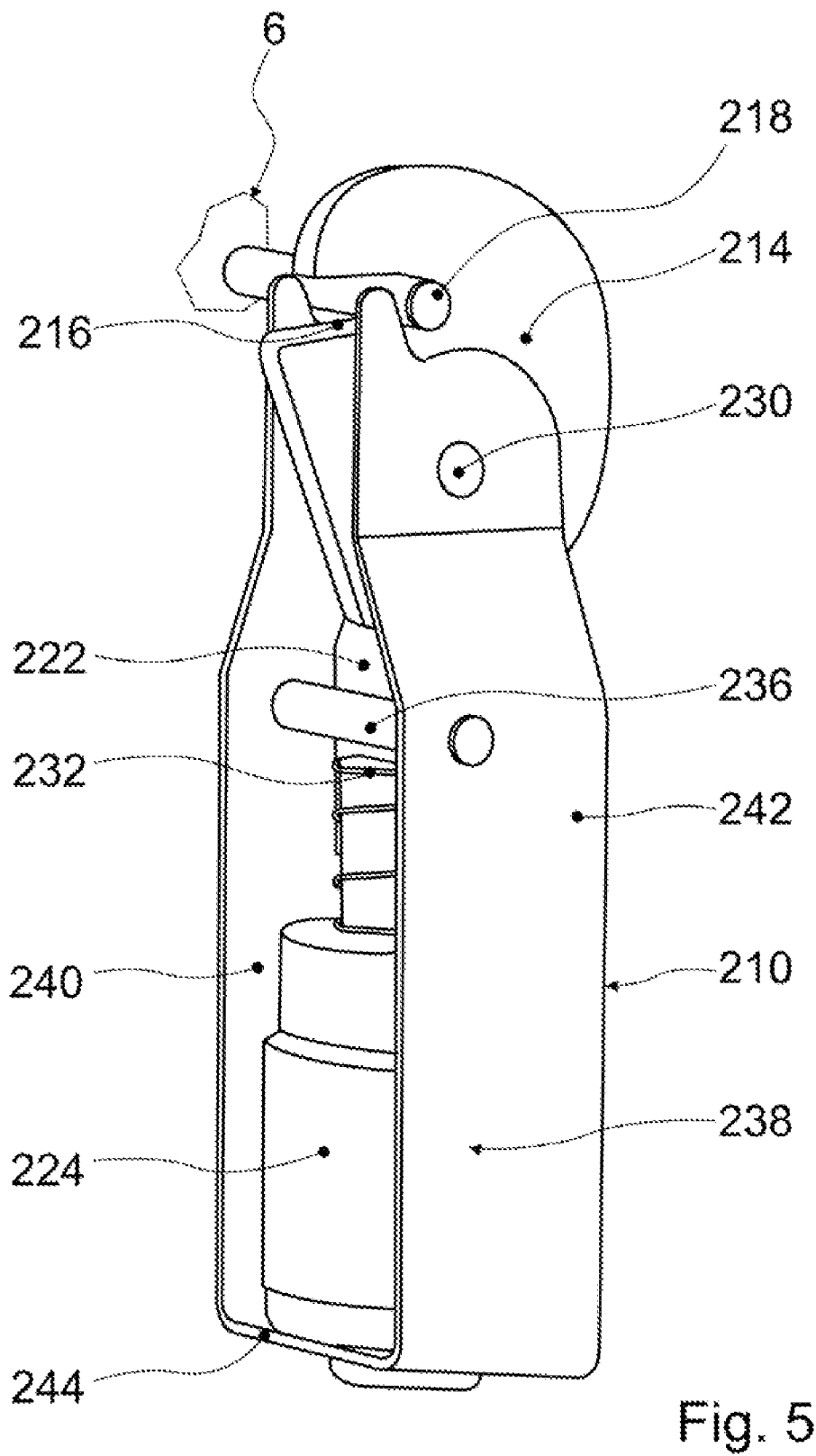
FIG. 5 is a perspective view of the holding device of FIG. 4 in the rest position of the rollover element.
Figure 6:
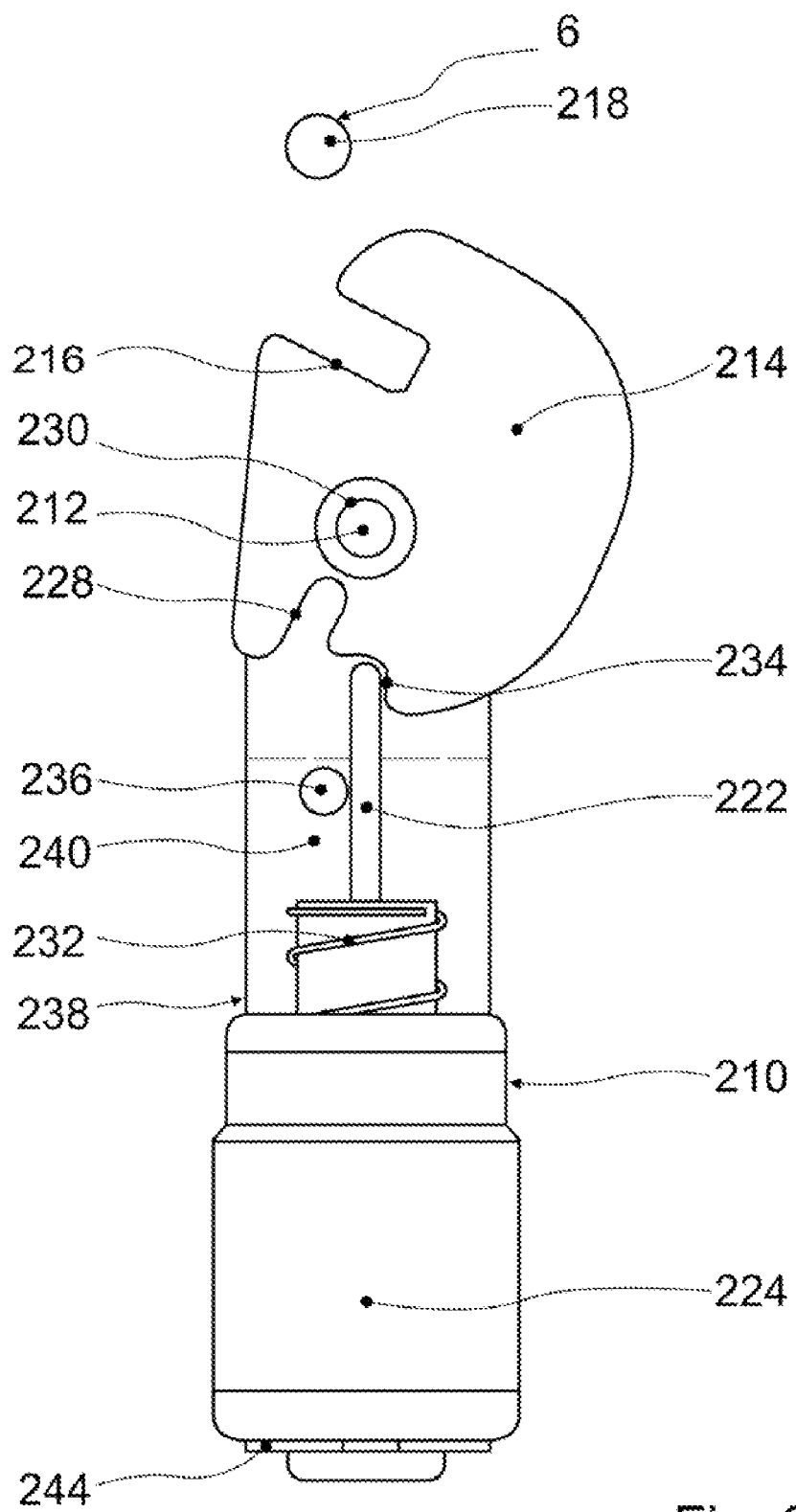
FIG. 6 is a partially cutaway side view of the holding device according to FIG. 4 and FIG. 5 after a release and movement of the rollover element into its deployed support position.

FIG. 4, FIG. 5 and FIG. 6 show, on an enlarged scale, the holding device 210 used in the embodiment according to FIG. 1 for holding the rollover element 6 of the rollover protection device 3.

The holding device 210 includes a locking element 214 mounted to pivot around a fixed axis of rotation 212, which is designed essentially disk-like and has a detent section 216 on its periphery, which is designed as a U-recess in the depicted embodiment cooperates with a mating element 218 on the rollover element 6.

The mating element 218, in the depicted embodiment, is designed as the pin that also serves as the height stop for the rollover element 6. Dimensioning and shaping of the mating element 218 in the U-recess of the detent section 216 are adjusted to one another, so that the mating element 218, during rotation of the locking element 214 around its axis of rotation 212, can slide unrestricted out of the detent section 216.

In alternative embodiments, instead of the pin proposed here, a retaining tab beneath a recess on the rollover element, a shoulder on the rollover element or an appropriate hook element can also be prescribed as the mating element 218.

In the lowered rest position of the rollover element 6, the locking element 214 is secured against a rotation that releases the holding device 210 by a blocking element 222, which cooperates with an actuator 224. The blocking element 222 is formed here as a flat tongue-like plate element fastened to a cylindrical piston, axially movable by the actuator 224.

In the rest position of the rollover element 6, the blocking element 222 engages a peripheral recess 228 of the disk-like locking element 214, so that the recess 228 forms a locking catch, which is aligned in the rest position of the rollover element 6 coaxially to a longitudinal axis of the blocking element 222 and the effective direction of the actuator 224, which corresponds to the movement direction of the rollover element 6 and extends in the direction of an eccentrically arranged pin 230 that forms the axis of rotation 212 of the locking element 214 essentially at right angles to the alignment of the U-shaped recess of the detent section 216.

The actuator 224, in an accident situation, is driven by a corresponding control device, in which the actuator 224, in the event of an accident, undergoes a status change, which results in the translatory displacement of the blocking element 222 against the force of a compression spring 232 in the direction of the actuator 224. The blocking element 222 is pulled out by this translatory movement in the direction of the actuator 224 from the peripheral recess 228 on the disk-like locking element 214 to a predefined point, such as a stop, so that it executes a rotational movement as a result of the tensile force exerted via the mating element 218 of the rollover element 6.

To limit this rotational movement, a stop 234 is formed on the periphery of the disk-like locking element 214, against which the blocking element 222, retracted on release of the holding device from the recess 228, comes to a stop after the rotation of the locking element 214 that disengages the detent section 216 from the mating element 218.

In the depicted embodiment, a pivoting of the locking element 214 around the axis of rotation 212 by about 30° is sufficient to release the holding device 210. Consequently, the peripheral contour of the locking element 214, in an area of about 30° in a region adjacent to the peripheral recess 228, is radially retracted against the rotational direction (in terms of release) of the locking element 214 up to the peripheral stop 234.

The stop 234, which holds the disk-like locking element 214 in position in cooperation with the blocking element 222 after release of the holding device 210, facilitates a simple reversal of the rollover protection system during any incorrect tripping.

The reversal then occurs simply by a rotation of the locking element 214 in the blocking direction, until the detent section 216 reengages with the mating element 218 of the rollover element 6, retracted to its rest position. In this position, the peripheral recess 228 is flush with the blocking element 222, which snaps into the peripheral recess 228 under the pressure of the compression spring 232 and secures the locking element 214 against rotation.

The locking element 214 represents a two-stage disk, in which the arrangement and dimensioning of the recess 228 and the stop 234 are to be chosen according to the arrangement and configuration of the actuator 224 and the blocking element 222.

Alternative embodiments may dictate, for example, that the stop 234 for the blocking element 222 be formed on the locking element 214 as a protrusion on the peripheral contour of the locking element 214, in which the stop can also be designed as a separate component fastened to the locking element 214.

In an alternative embodiment, the proposed angle of rotation of the locking element 214 between the locked and unlocked positions and the configuration of the blocking element 222, which can also be a pin instead of the depicted flat plate element, can be chosen according to the corresponding application.

As can be further gathered from the figures, an abutment 236, in the form of a pin, is provide to the side of the blocking element 222, and serves to take up the forces that are exerted laterally in the released state of the holding device 210 by the locking element 214 and the stop 234 on the blocking element 222. By means of the abutment 236, a tilting of the blocking element 222 in the released state of the holding device 210 can be avoided even with a very long design of the blocking element 222.

The abutment 236, like the pin 230 that forms the axis of rotation 212, is mounted on a base element 238 of the holding device 210, representing a housing element, in which the base element 238 has opposite sides 240, 242, between which the pin 230 and the abutment 236 are supported.

In the depicted embodiment of the base element 238, only one side 240 of which is shown in FIG. 6, is designed with a U-profile, which can be a deformed flat strip. The base element 238, in the present case, in its installed state, has on its upper end, i.e., on the free ends of the sides 240, 242, a ramp-like guide 246 for the secure guiding of the rollover element 6 and its mating element 218 into the engagement region with the detent section 216 of the locking element 214.

A cross-arm 244, which is used in the present case as a seat for the actuator 224, extends between the sides 240, 242 of the base element 238, forming the U-arms of the U-profile.

The depicted base element 238 therefore forms a sort of system cage, which advantageously fulfills the tasks of a housing, frequently designed quite expensively in known embodiments, with a much simpler configuration.

The actuator 224, in the embodiments depicted in FIG. 4, FIG. 5 and FIG. 6, is formed as an electromagnetic actuator of the usual design, but actuators operating according to another action principle, for example, piezoelectric actuators, pyrotechnic actuators or actuators equipped with a fusible insert, are also suitable for use in the holding device 210.

Figure 7:
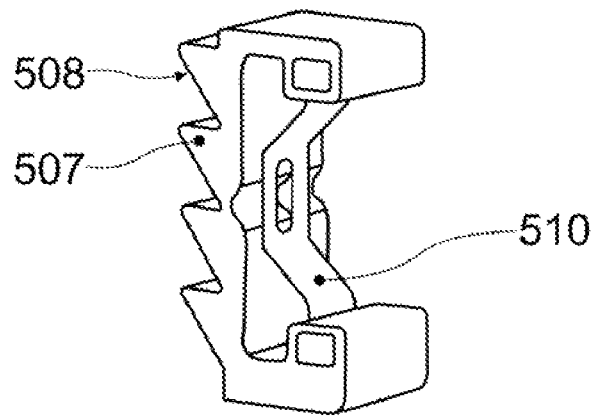
FIG. 7 is a perspective view of a catch device of a locking device of the rollover protection device according to FIG. 1 to FIG. 3 in a single position.

In its deployed support position to provide a survival space for the vehicle occupants, the rollover element 6 is automatically blocked by the locking device 500 or 600, in which the locking device 500 has at least one first catch device 505, according to the embodiment depicted in FIG. 1 to FIG. 3 and FIG. 7, which is formed with a U-shaped detent 508. The detent 508, which is shown in FIG. 7, has in the area of its U-cross-arm a tooth profile 507 with teeth tapering to a point, the geometry of which is chosen such that they engage in the support position of the rollover element 6 in a catch strip 509 of a second catch device 506 formed on the rollover element 6.

The detent 508 is then supported on the tubular guide device 30, in which it is inserted into a peripheral recess 31 of the tubular guide device 30, which has essentially the peripheral contour of the detent 508. The detent 508 is therefore held in the axial movement direction Z of the rollover element 6 in shape-mated fashion on the tubular guide device 30.

In the transverse direction of the rollover element 6, i.e., in the movement direction of the detent 508, the detent 508 is spring-loaded by means of a leaf spring 510.

As can be gathered, in particular, from FIG. 7, the leaf spring 510, in the installed position depicted here, is initially arranged in the longitudinal direction of the detent 508. With this position of the leaf spring 510, the detent 508 can be inserted into the recess 31 on the tube profile 30 that is produced by milling. When the leaf spring 510 is rotated 90° into its functional position, it is introduced with its axial ends into receiving slits 33 formed on the tubular guide device 30, so that the detent 508 is mounted spring-loaded by means of a leaf spring 510 relative to the tubular guide device 30.

Figure 20:
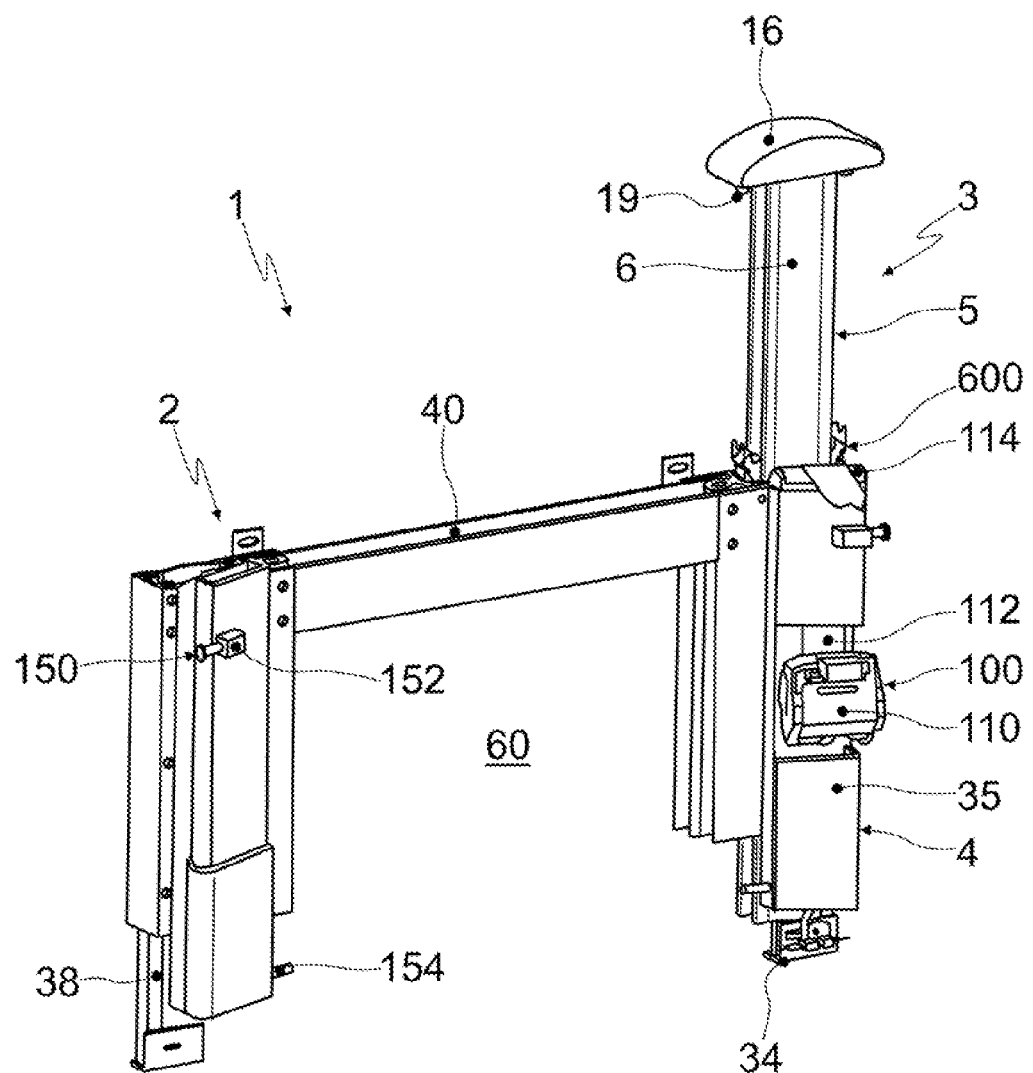
FIG. 20 is a simplified perspective sketch of another embodiment of a rollover protection system according to the invention with an integrated restraining belt unit.
Figure 21:
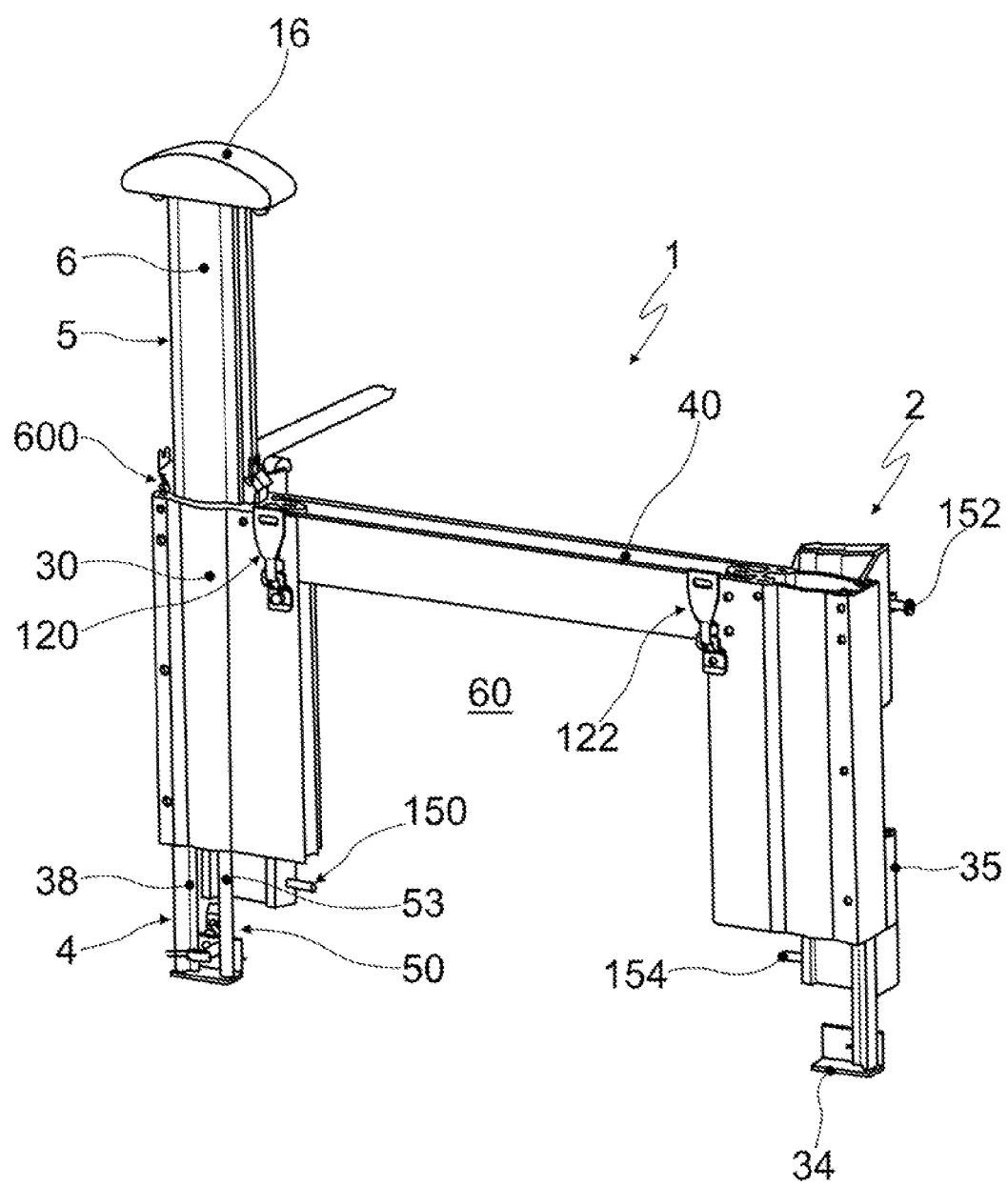
FIG. 21 is a rear view of the rollover protection system of FIG. 20.
Figure 22:
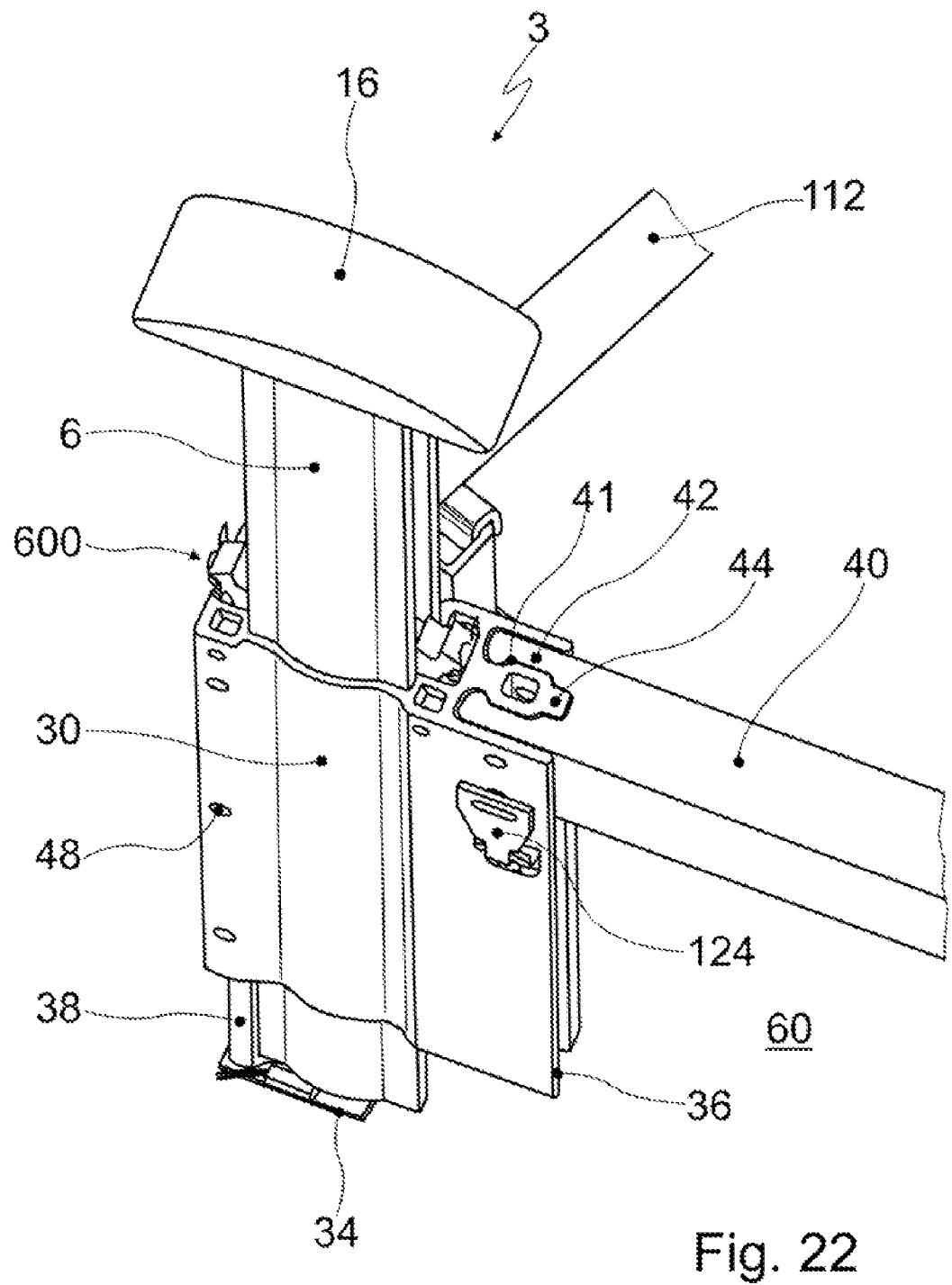
FIG. 22 is a perspective view of an area of the rollover protection system of FIG. 20 and FIG. 21.

FIG. 8 shows an embodiment of the rollover protection device 3, which is part of a component group shown in FIG. 20 to FIG. 22, with an identical design of the corresponding rollover protection device 2, but is also suitable for the component group depicted in FIG. 1. Details of the rollover protection device 3 of FIG. 8 are shown more clearly in the exploded view of FIG. 8a.

The embodiment of the rollover protection device 2 or 3 according to FIG. 8 differs from the embodiment according to FIG. 1 to FIG. 7 essentially by an alternative holding device 310 for the rollover element 6 and an alternative locking device 600 designed to support the rollover element 6 in its deployed position and a modified drive system 50. With respect to its profile configuration, the rollover element 6, which has an essentially oval cross-sectional shape here, corresponds essentially to the embodiment according to FIG. 1 to FIG. 7.

Figure 8A:
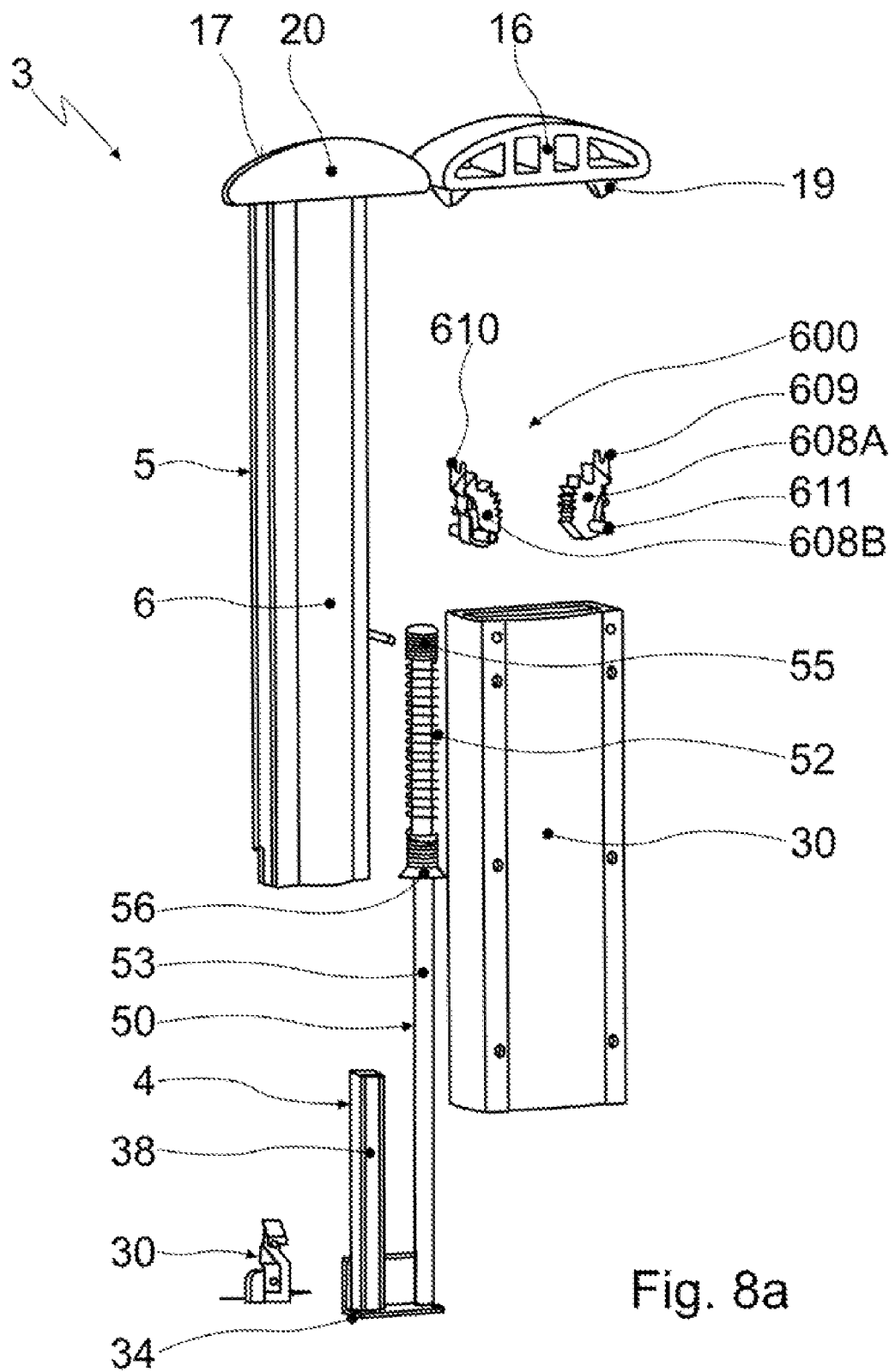
FIG. 8a is an exploded view of the rollover protection device of FIG. 8.
Figure 9:
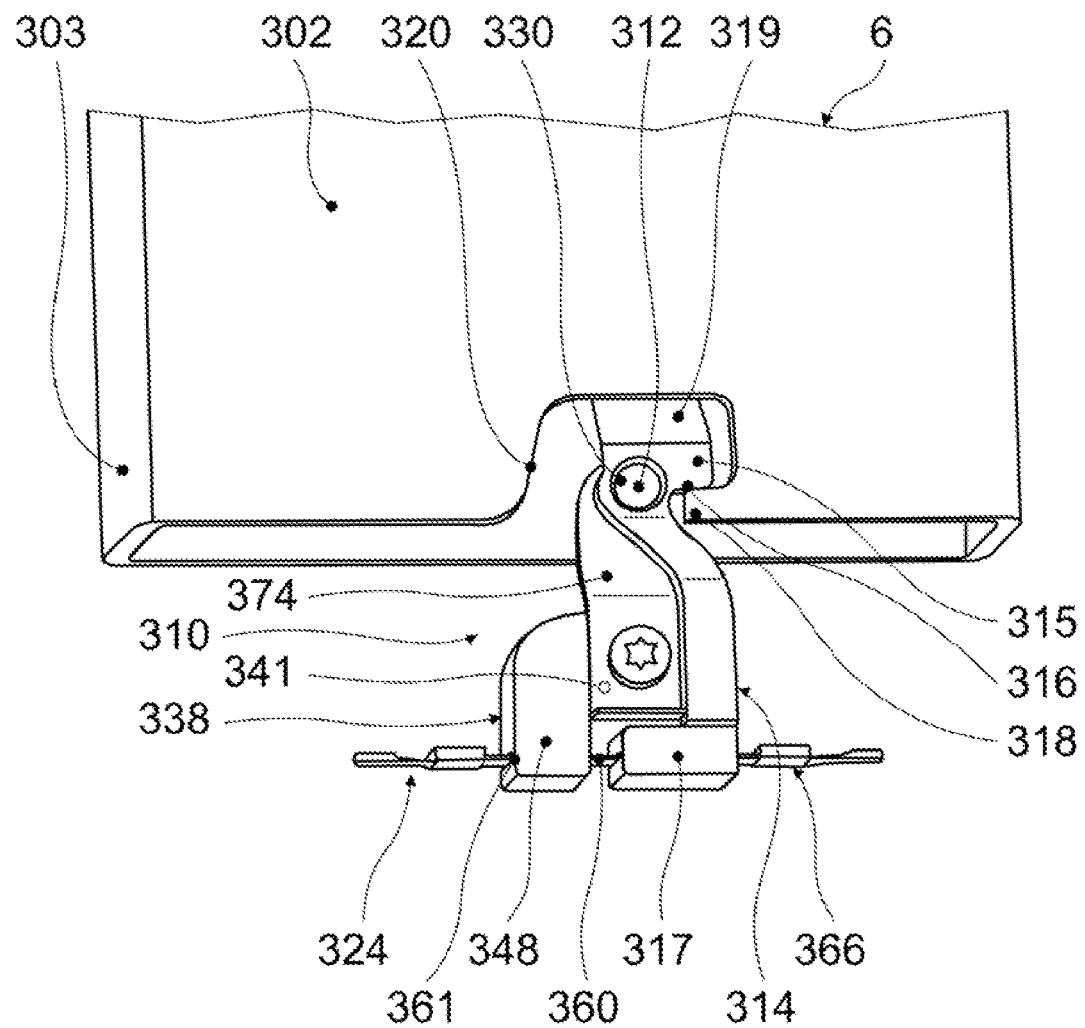
FIG. 9 is a simplified and exposed perspective view of the holding device of the rollover protection device according to FIG. 8.

As is readily apparent in FIG. 8a, the spring force accumulator 52 is designed here as a tension spring, which is guided in the receiving channel 8 of the rollover element 6 on a spring guide rod 53. A spring suspension 55 is formed on the upper end of the spring guide rod 53, and a spring retainer 56 is mounted displaceable on a middle area, in which the tension spring 52 is biased in tension between the spring suspension 55 and the spring retainer 56 that lies against a stop of the rollover element 6 in the rest position of the rollover element 6.

FIG. 9 to FIG. 12 show, in a simplified view, the holding device 310 equipped with a fusible insert 348 for holding the rollover element 6 of the rollover protection device 3.

The holding device 310 includes a locking element 314 mounted to pivot around a fixed axis of rotation 312, which locking element has a detent section 316 on its periphery, which in the depicted embodiments is formed again as a U-recess and is laid out to cooperate with a mating element 318 on the rollover element 6.

The mating element 218 could also be formed as a retaining tab beneath a recess on the rollover element 6, or also as a pin, a shoulder on the rollover element or as a suitable hook element.

In the embodiment according to FIG. 9 to FIG. 12, the mating element 318 is formed as a shoulder in the region of a recess 320 on the rollover element 6, open toward the lower edge of the rollover element 6, in which the recess 320, the mating element 318, shown as a shoulder, and the detent section 316 of the locking element 314 are also suitably configured, so that the locking element 314, during rotation around its axis of rotation 312, can be easily disengaged from the detent section 316. Here again, the rollover element 6, in its lowered rest position, is held by engagement of the locking element 314 with the mating element 318 and can be released by activation of an actuator 324, in which the actuator 324 permits rotation of the locking element 314, at least in areas, so that it disengages from the mating element 318.

In the embodiment according to FIG. 9 to FIG. 12, the locking element 314 is held by a fusible insert 348 of the actuator 324, which can be melted in the event of an accident, in its rest position to lock the rollover element 6, in which the locking element 314, in the rest position, is connected radially and loaded under tension to a base element 338 via the fusible insert 348.

The locking element 314, in this embodiment, is designed lever-like as a pivot lever. One lever end 315 has a detent section 316 for engagement with the mating element 318 and the other lever end 317 has a mount 360 for the fusible insert 348 connected to an energy supply device 366.

The base element 338 is a block element with an essentially L-shaped cross-section, one L-arm 339 having a mount 361 for the fusible insert 348 with the energy supply device 366 and the other L-arm 341 having a support 374 of the pivotable locking element 314 with its cap bolt 330.

The support 374 represents a support plate, screwed to the L-arm 341 of the base element 338, free of rotation, which support plate is screwed to one side of the base element 338 and is bent S-shaped against the support of the cap bolt 330 of the locking element 314, so that the locking element 314, the support 374 and the cap bolt 330 have an extension in the axial direction of the cap bolt 330 that corresponds essentially to the depth of the base element 338 that axially covers this component group. The holding device 310 therefore advantageously has a very limited design depth.

The locking element 314 is flush in the embodiment depicted in FIG. 9 to FIG. 12 with a side wall 302 of the rollover element 2, designed essentially as a box profile here and representing a cassette, and engages laterally, so to speak, in a rollover element 2 biased by spring force in a recess 320 open to the lower edge, in which the locking element 314 engages a tab-like shoulder that forms the mating element 318, formed on the contour of the recess 320.

It should be understood that one skilled in the art, depending on the application, can also choose an arrangement of the holding device 310 on a narrow side 303 of the rollover element 6, or engagement in a recess with a retaining tab.

The mounts 360, 361 for the fusible insert 348 are also designed here as grooves, into which the plate-like fusible insert 348 can be inserted and firmly locked. The fusible insert 348 can have a shape that is adjusted to the grooves holding it and a cross-sectional narrowing in its middle region for more rapid meltability.

The energy supply device 366 designed to produce the heat necessary to melt the fusible insert 348 is expediently designed by means of clamps 365, 367 fastened to the end of the fusible insert 348 and connected to a current source.

The material of the fusible insert can represent any metal and/or plastic material known for fuses.

Figure 10:
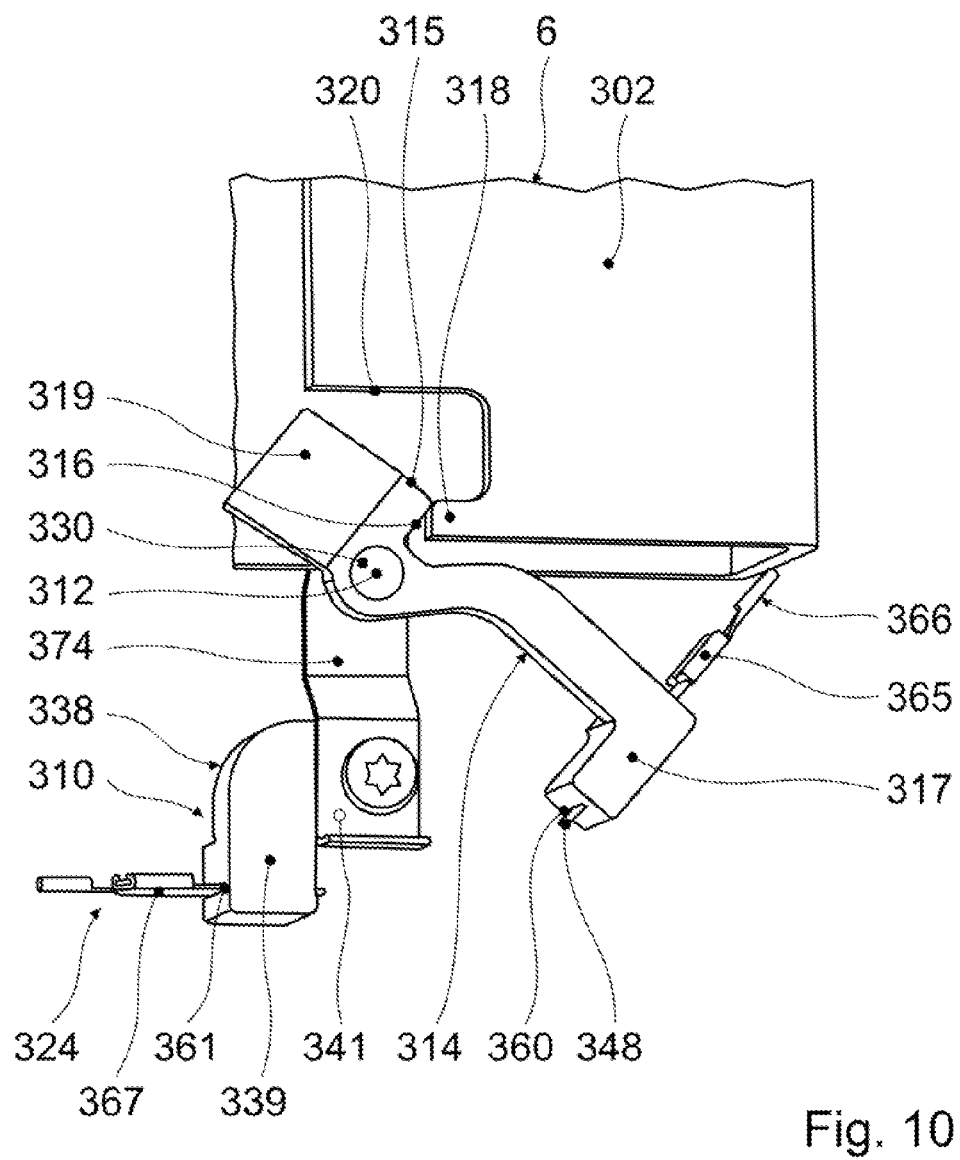
FIG. 10 is a simplified perspective view of the holding device of FIG. 9 during triggering and release of the rollover elements for transfer into a support position.

As is particularly apparent in FIG. 10, during melting and severing of the fusible insert 348 as a result of current supply, which is established by a control device when a crash situation is recognized, the biased rollover element is released from the locking element 314, in which case the locking element 314 is pivoted by the deploying rollover element 6 because of the tensile load, with the detent section 316 disengaging from the mating element 318.

Figure 11:
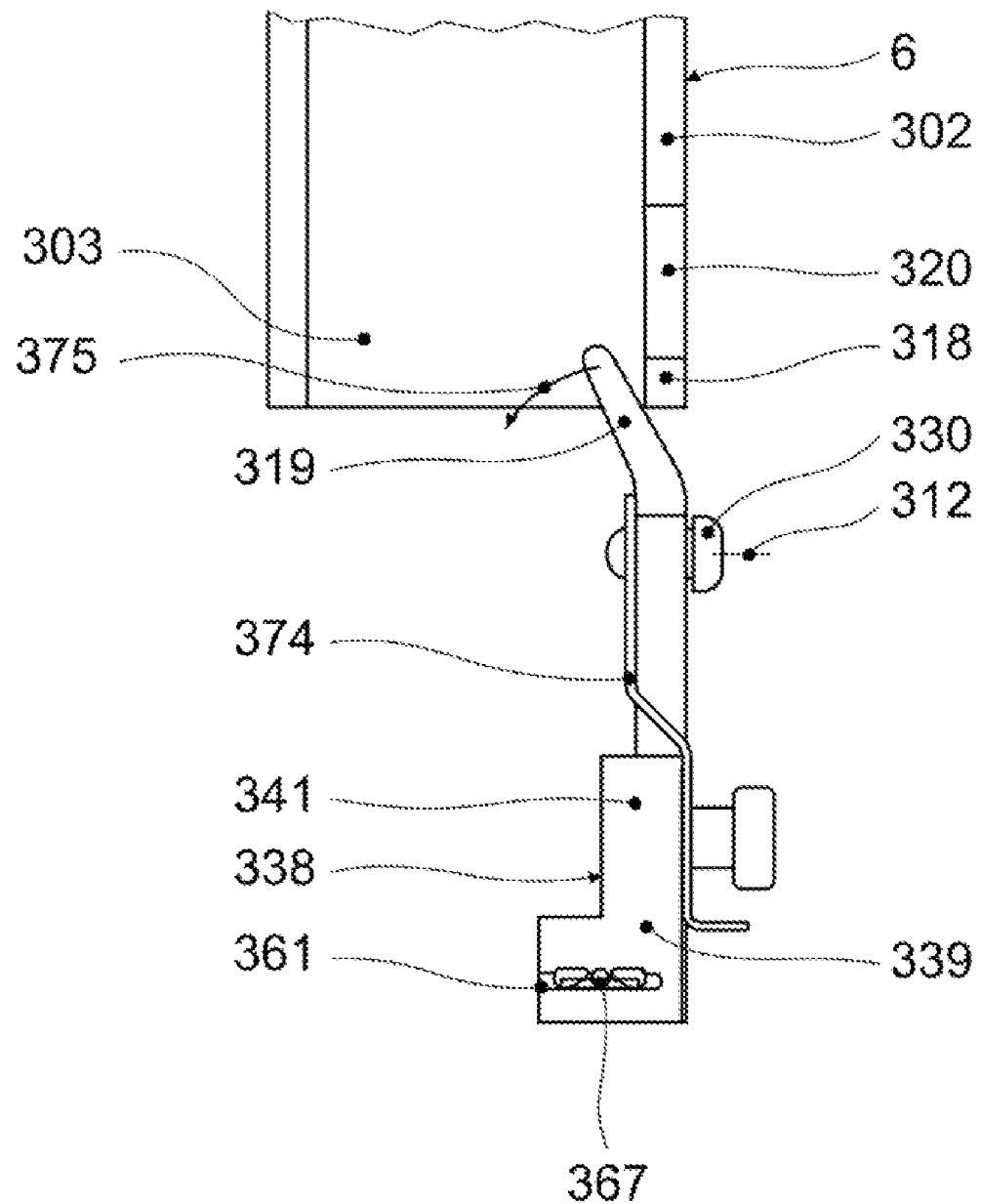
FIG. 11 is a simplified front view of the releasable holding device according to FIG. 9 and FIG. 10 in a reversing position.
Figure 12:
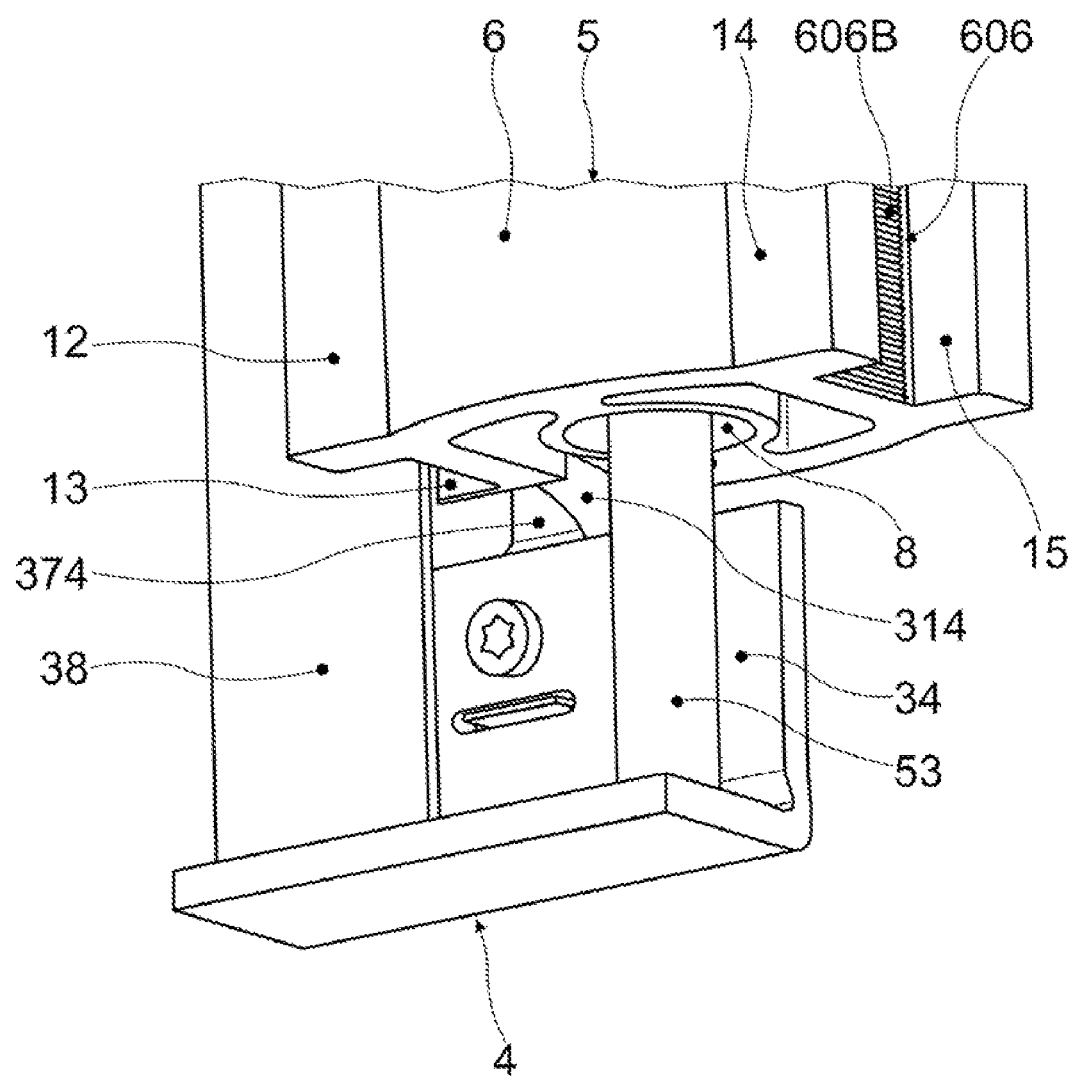
FIG. 12 is a simplified, perspective view of the rollover protection device of FIG. 8 in the area of the releasable holding device according to FIGS. 9 to 11.

Reversal of the rollover protection system with a return of the deployed rollover element 6 to its lowered rest position can occur in the practical example according to FIG. 9 to FIG. 12 simply by lowering the rollover element 6 into its rest position, in which the rollover element 6 initially encounters a slope 319 of the locking element 314, particularly apparent in FIG. 11, which is formed on the upper edge of the lever end 315 that faces the rollover element 2 and runs in the axial direction of the cap bolt 330 of the locking element 314.

The locking element 314 is designed to be flexible, at least in sections, so that the downward moving rollover element 6 (with the shoulder 318), sliding along the slope 319, deflects the locking element 314 in the direction of the arrow 375, apparent in FIG. 11, until the detent section 316 snaps into the recess 320 of the rollover element 6 and holds it.

FIG. 13 to FIG. 16 show another embodiment of a holding device 410 for holding the rollover element 6, which corresponds to the embodiment depicted in FIG. 9 to FIG. 12 with respect to the locking element, but can be driven pyrotechnically and can be used as an alternative to the holding device 310, depicted in FIG. 9 to FIG. 12.

Like the holding devices 210 and 310 previously described, the holding device 410 also includes a locking element 414 mounted to pivot around a fixed axis of rotation 412, which is formed essentially like the locking element 314 of the holding device 310 depicted in FIG. 9 to FIG. 12 on its periphery with a detent section 416, and which cooperates with a mating element 418 on the rollover element 6.

The mating element 418, in this embodiment, is also designed as a shoulder in the region of a lower edge of the rollover element 6 beneath an open recess 420 on the rollover element 6.

Figure 13:
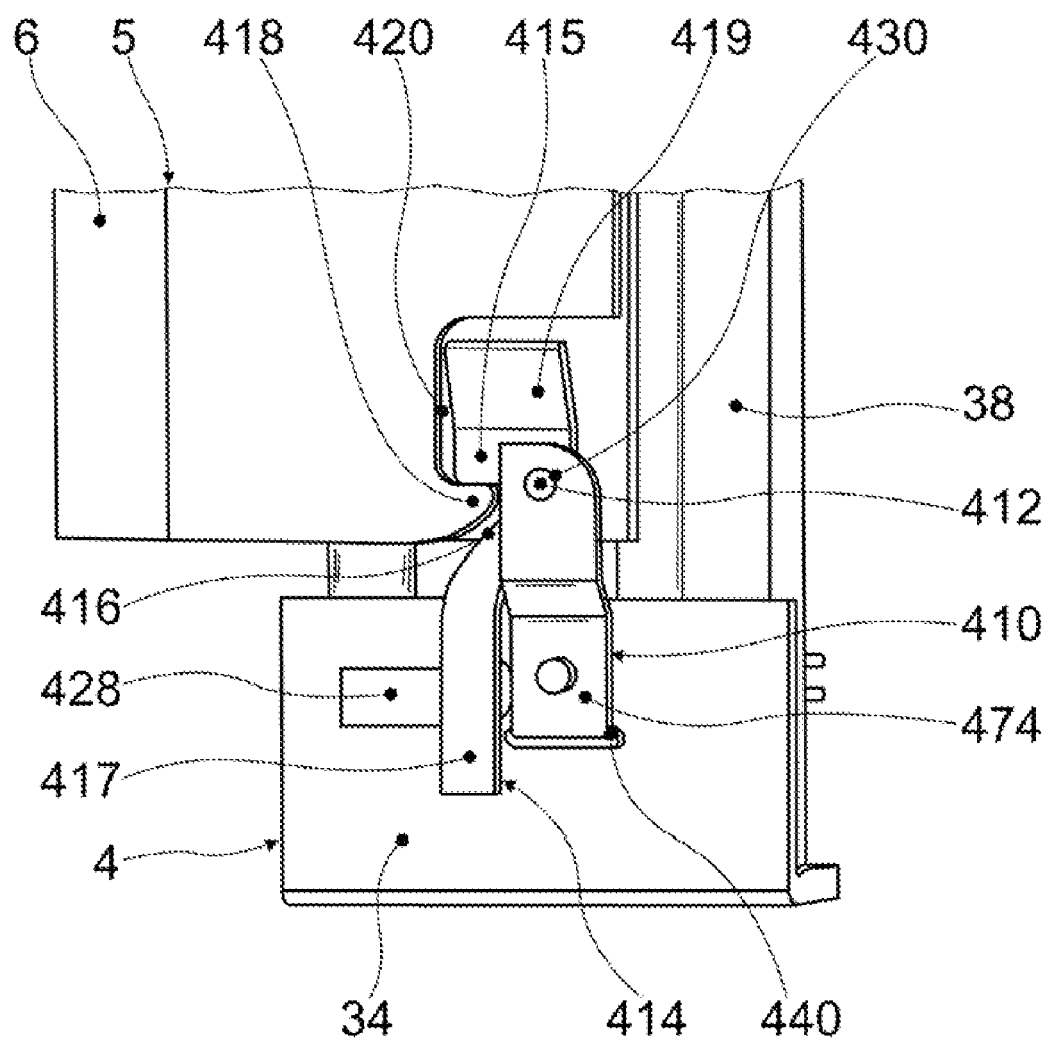
FIG. 13 is a front view of a pyrotechnic embodiment of a releasable holding device for the rollover protection device according to FIG. 1 and FIG. 8 in the rest state of the rollover element.
Figure 14:
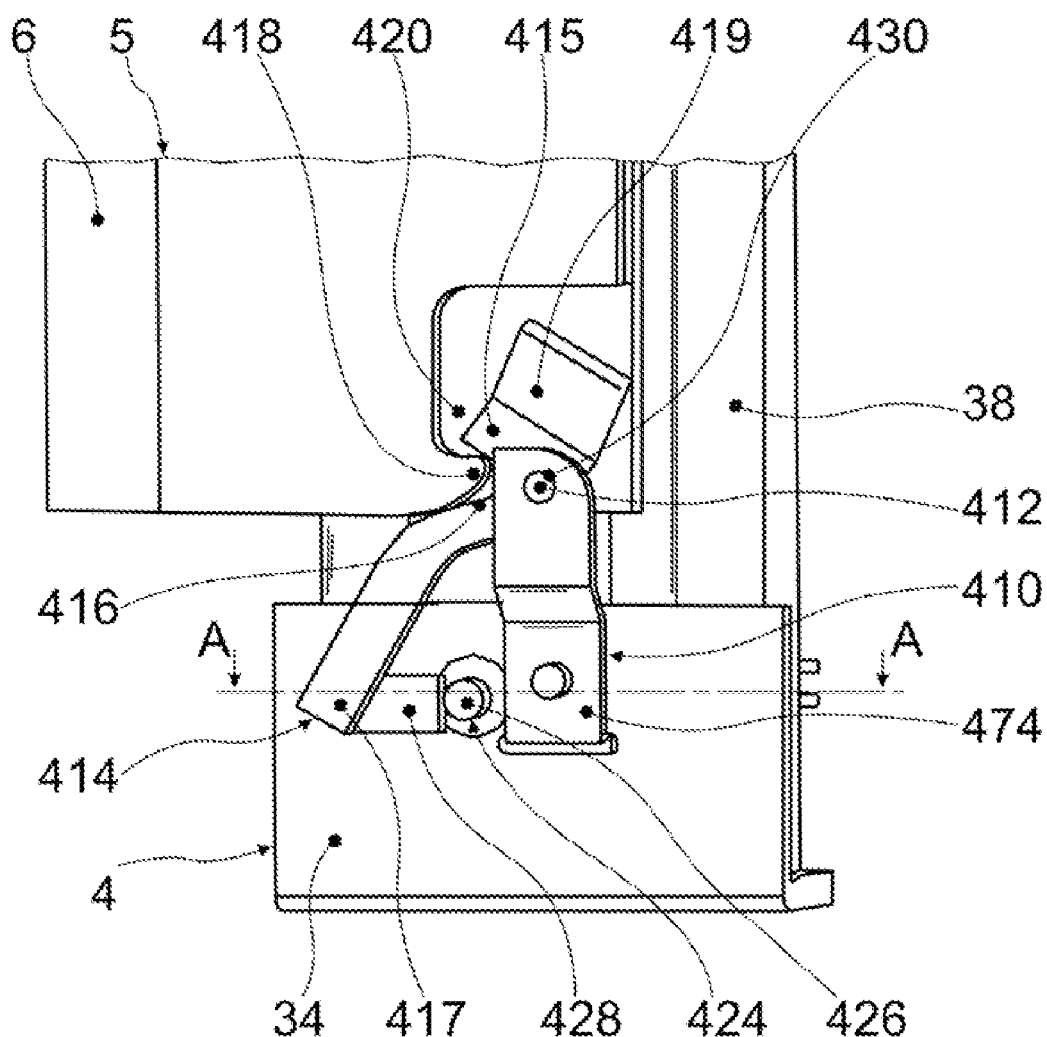
FIG. 14 is a perspective view of the holding device of FIG. 13 during triggering and release of the rollover element for transfer into its support position.
Figure 15:
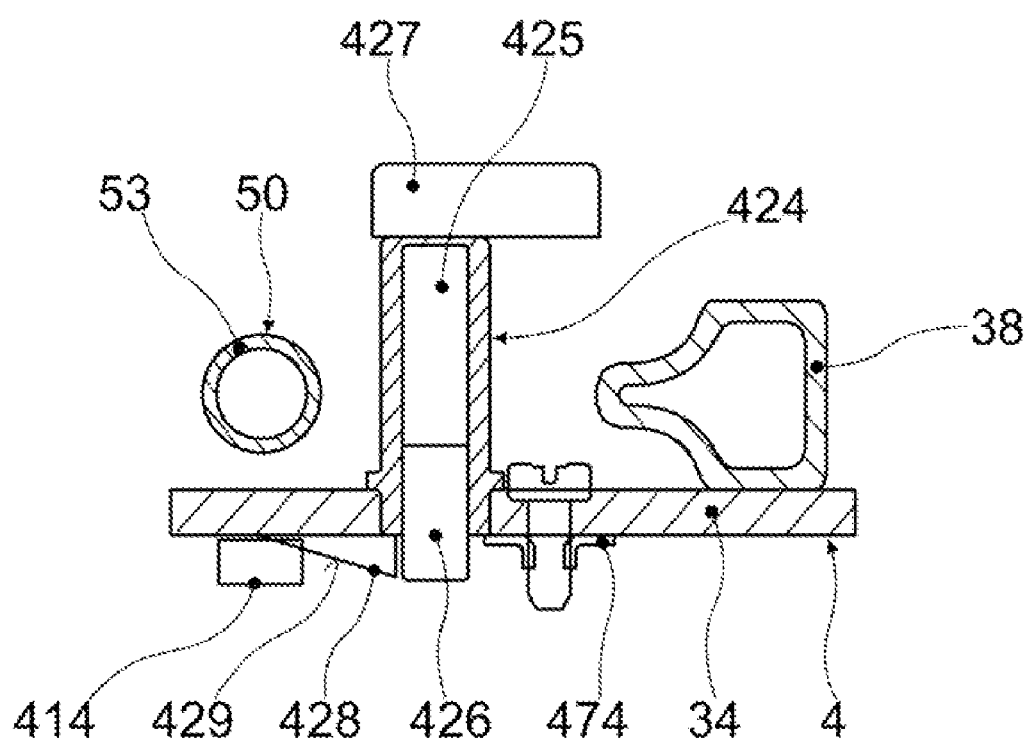
FIG. 15 is a simplified cross-section through the holding device of FIG. 13 and FIG. 14 along line A-A in FIG. 14.
Figure 16:
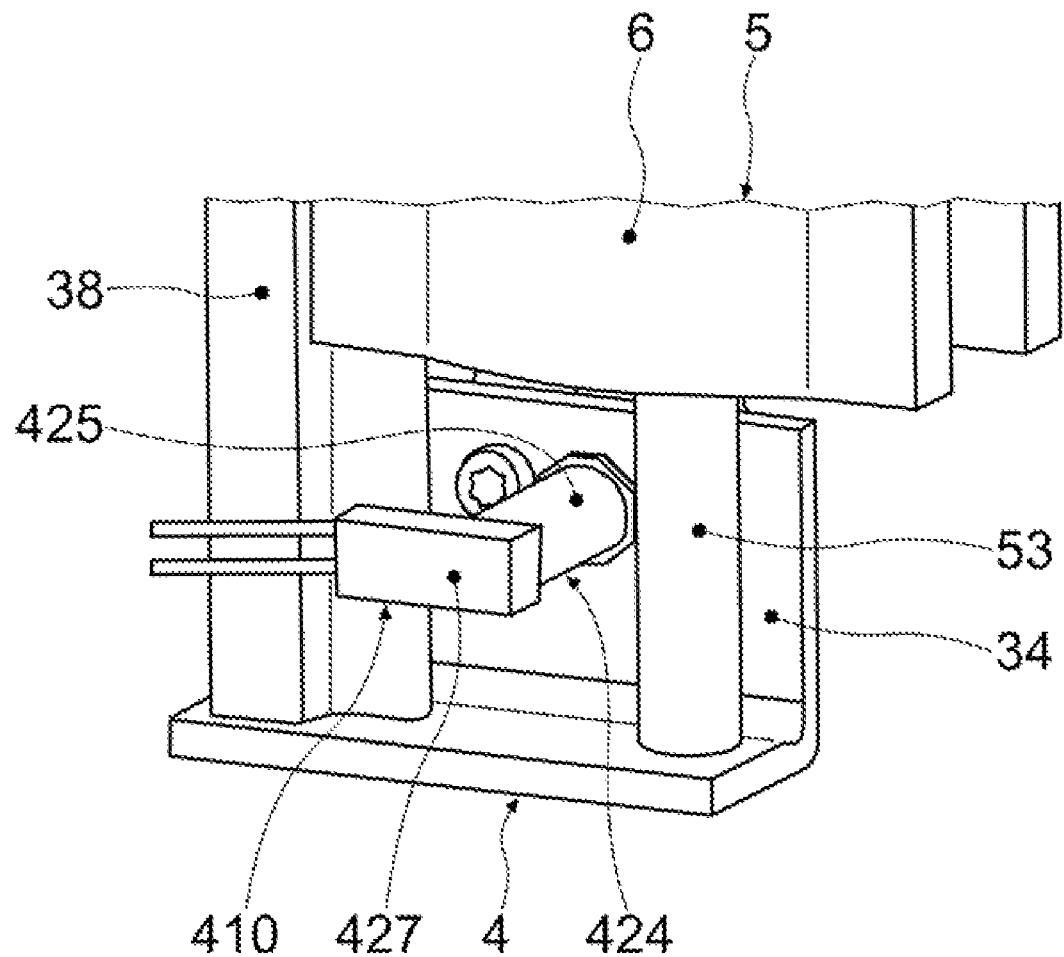
FIG. 16 is a simplified, perspective view of the rollover protection device in the area of the releasable holding device according to FIG. 13 to FIG. 15.

For release of the rollover element 6, the locking element 414 must be transferred from a rest position, depicted in FIG. 13, in which the locking element 414 is engaged with the mating element 418, into a pivoted position, depicted in FIG. 14 and FIG. 15, in which the locking element 414 releases the rollover element 6.

The locking element 414 is designed in the fashion of a pivot lever, in which one lever end 415 lies against the detent section 416 for engagement with the shoulder of the rollover element 6, representing the mating element 418, and the other lever end 417 lies laterally against a stop element 428, which forms an abutment for the force exerted by the rollover element 6 on the locking element 414 and prevents rotation of the locking element 414.

To support the locking element 414 on the first module 4 of the rollover protection system, which is attached to the vehicle, a support plate 474, screwed to the foot element 34 of the rollover protection device, is provided, which lies against one side of the foot element 34 and is guided in it by a tab 440 and carries on its other end a cap bolt 430 for the pivotable locking element 414. The support plate 474 is bent S-shaped against the support of the pin 430, so that the locking element 414, the support plate 474 and the cap bolt 430 have a cover in the axial direction of the cap bolt 430 and therefore only require limited design depth.

The actuator 424, which causes a pivoting of the locking element 414, has a pyrotechnic propellant charge 425 in the present case. The pyrotechnic propellant charge 425 in the depicted embodiment is arranged on the side of the foot element 34 that faces away from the stop element 428 and the support plate 474, so that its effective direction is essentially perpendicular to the pivot direction of the locking element 414.

As can be gathered, in particular, from FIG. 15, the pyrotechnic propellant charge 425 drives a pin 426 that passes through the foot element 34, which is arranged so that in the rest state of the locking element 414, it lies against it. During electrical contacting of the pyrotechnic propellant charge 425 by means of an ignition device 427 during an accident signal, the pin 426 is pushed by the pyrotechnic propellant charge 425 in the direction of the lower lever end 417 of the locking element 414, until the locking element 414, with its lower lever end 417, is raised above the stop element 428. Because of the force acting against the rollover element 6 in the deployment direction, the locking element 414 is then pivoted, sliding on a wedge surface 429 of the stop element 428 in the direction of the foot element 34.

The reversal of the holding device 410 for holding the retracted rollover element 6 in its rest position can occur, in that back-pivoting of the locking element 414 occurs in a retracted pin 426 of the pyrotechnic propellant charge 425, in which the rollover element 6, during movement into its rest position, encounters a slope 419 of the locking element 414 that runs in the axial direction of the cap bolt 430 and is formed on the upper edge of the upper lever end 415 of the locking element 414. A certain flexibility of the locking element 414 during sliding of the rollover element 6 along the slope 419 with the mating element 418 permits a deflection of the locking element 414 in the axial direction of its cap bolt 430, until the detent section 416 snaps into the recess 420 of the rollover element 6.

Figure 17:
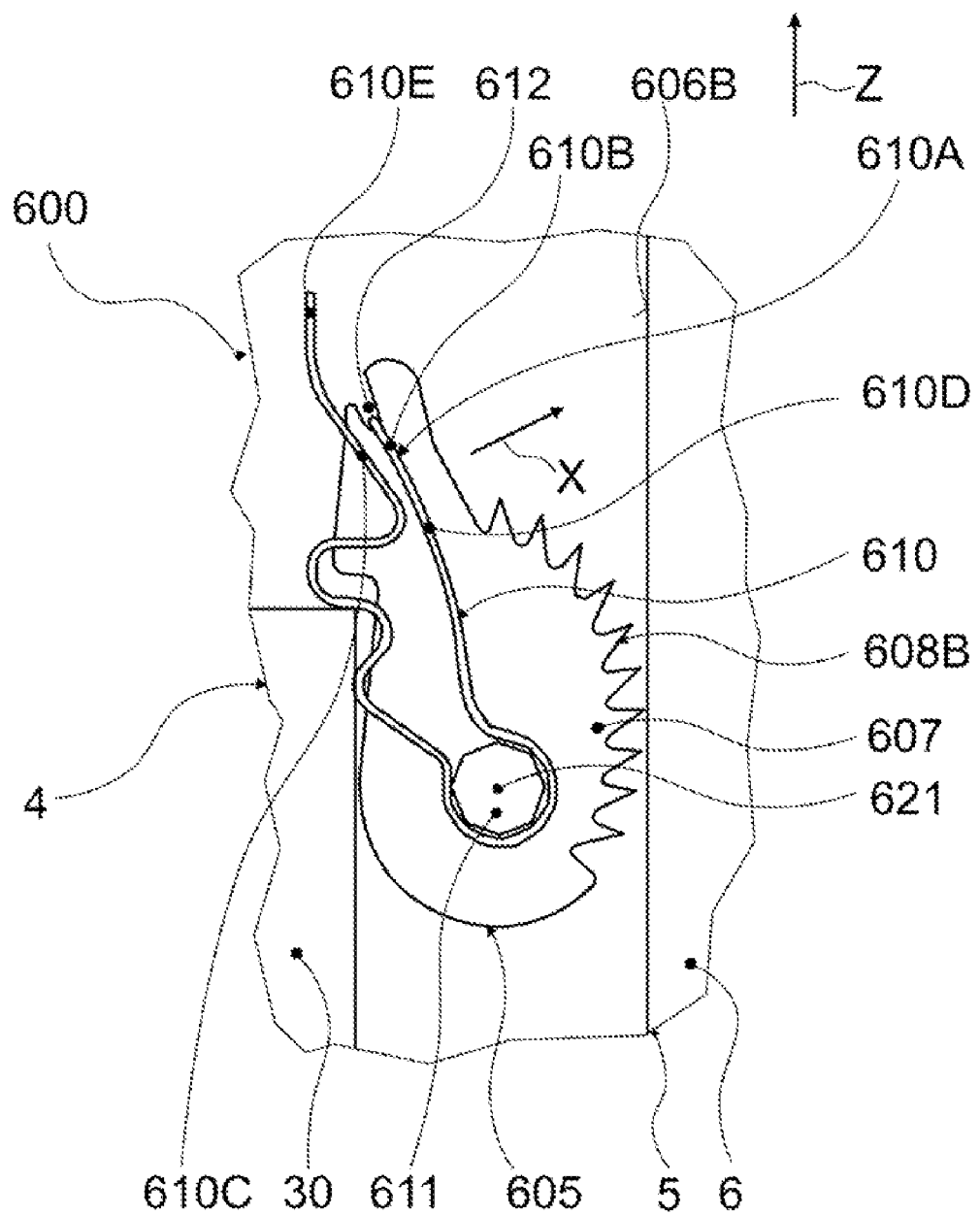
FIG. 17 is a partial section of an area of the locking device of the rollover protection device of FIG. 8.
Figure 18:
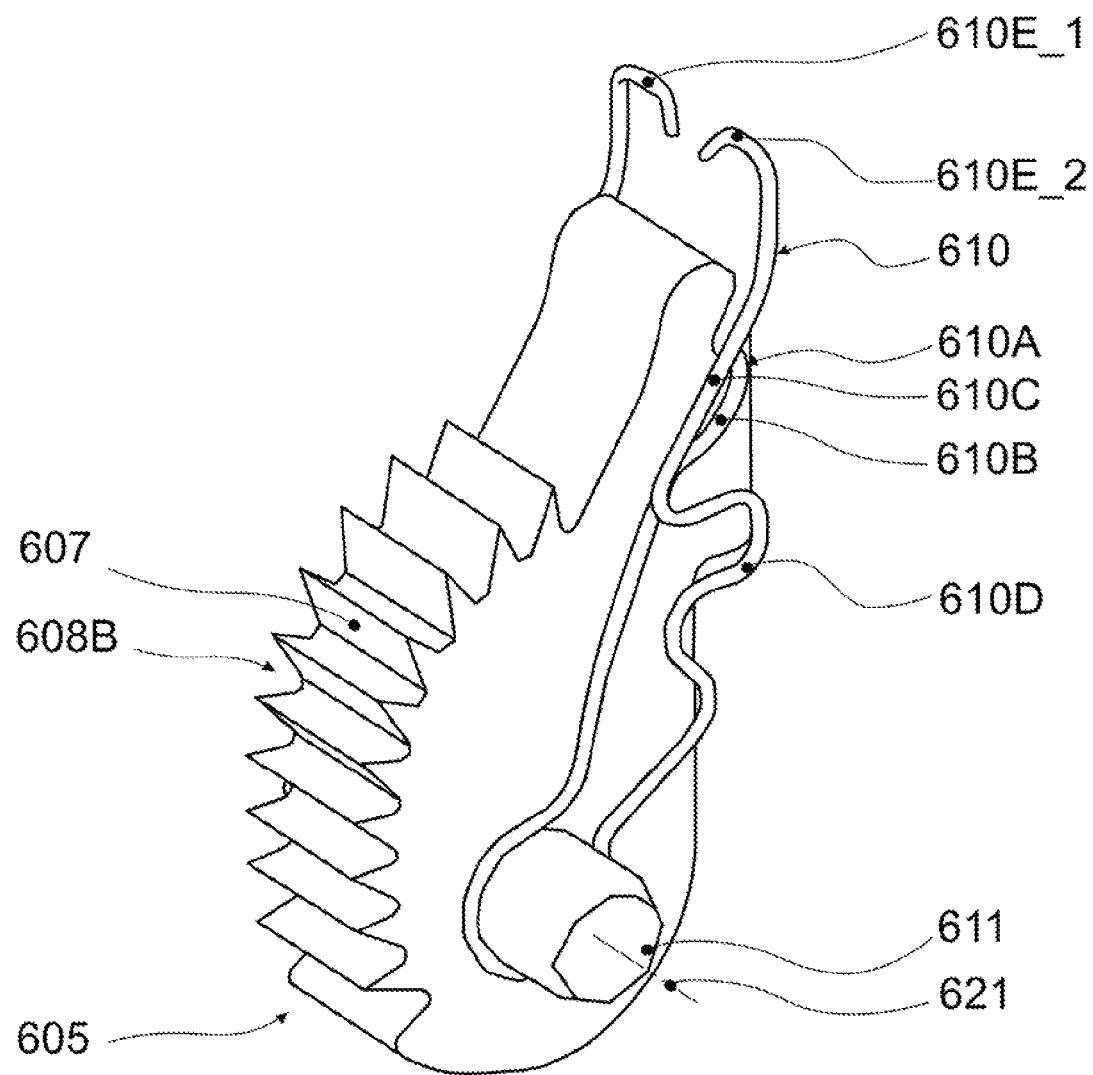
FIG. 18 is a perspective view of a catch device of the locking device according to FIG. 17 in a single view.
Figure 19:
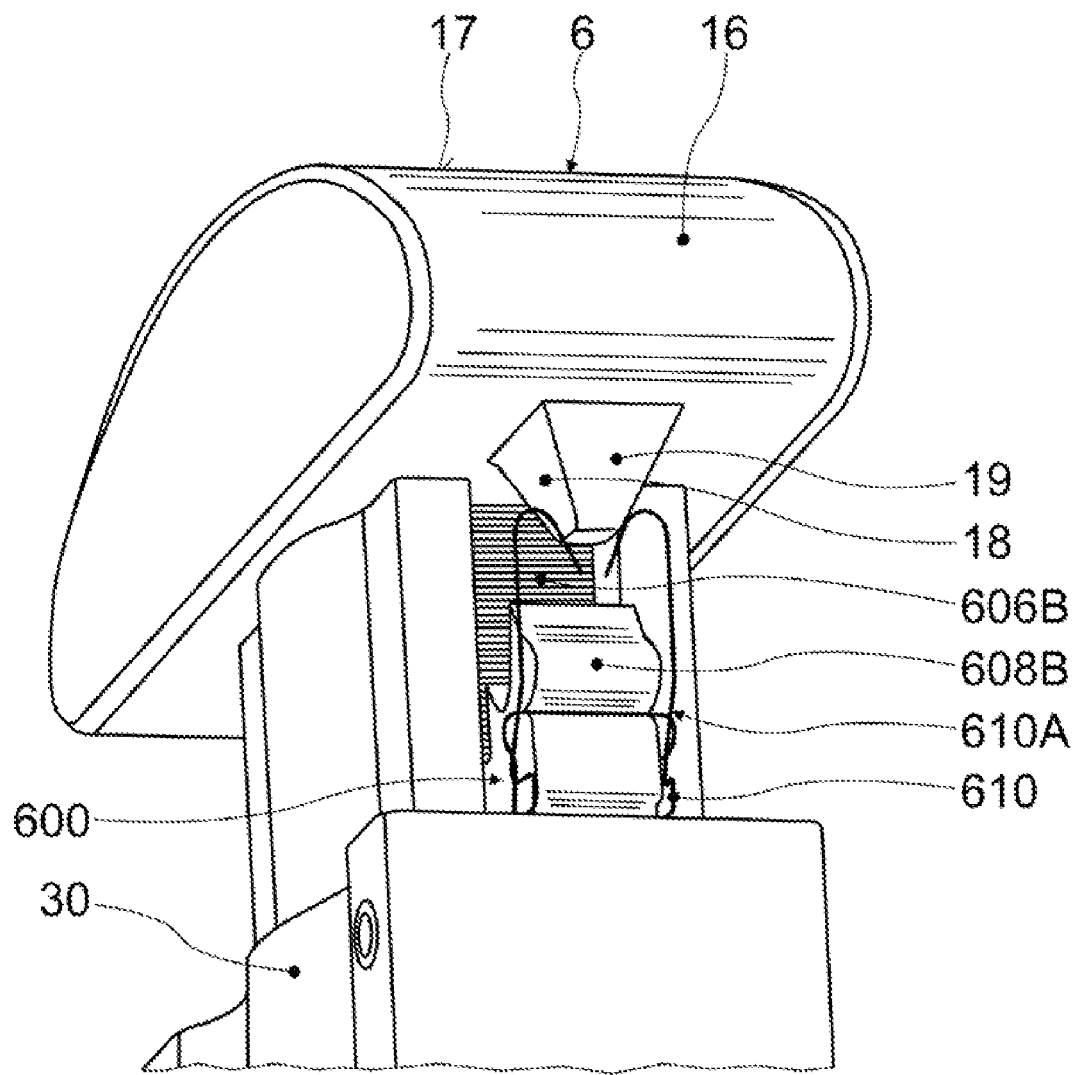
FIG. 19 is a simplified perspective view of the rollover protection device in the area of the locking device according to FIG. 17 and FIG. 18 in a rest state of the rollover element.

FIG. 17 to FIG. 19 show further the locking device 600, used in the embodiment of the rollover protection device according to FIG. 8, for the automatic locking of the deployed rollover element 6 in its support position.

The locking device 600 has at least one first catch device 605 firmly connected to the first module 4, which can be effectively connected to a second catch device 606, firmly connected to the second module 5 for support of the second module 5, and which permits movement of the second module 5, starting from its rest position, in the direction of its support position.

The first catch device 605 of the locking device 600, in the practical example depicted in FIG. 8, comprises two blocking elements 608A, 608B, that can be acted upon by a force in the direction of their effective position, are mounted to rotate about an axis 621 and are each designed with a tooth profile 607.

A spring device 609, 610 is allocated to each blocking element 608A, 608B, via which the blocking elements 608A, 608B are spring-loaded in the direction of the effective position of the first catch device 605, so that the blocking elements 608A, 608B are pivoted around the cap bolt from the position shown in FIG. 17 in a direction of rotation, shown by the arrow X in FIG. 17.

The cap bolts 611, in the present case, are supported on the module 4 attached to the body, in which the blocking elements 608A and 608B are fixed and therefore clearly positioned via spring devices 609 and 610 formed as clip wire springs in the axial extent in the manner further shown in FIG. 17 and FIG. 18.

For this purpose, the spring devices 609 and 610 engage the cap bolt 611 on both sides of the blocking elements 608A and 608B, designed here disk-like. The spring devices 609 and 610 are biased in the installed position in the wraparound area of the cap bolt 611, in order to adjust the friction force between the spring devices 609 and 610 and the cap bolt 611 to a value, so that the blocking elements 608A and 608B are not movable on the cap bolt 611.

This embodiment, in comparison with a press-fit between the cap bolts and the blocking elements, leads to a reduction in manufacturing costs, and also a simplification of assembly, since, in the area of the joint diameter, lesser requirements are imposed on the manufacturing tolerances, and the cap bolts can be integrated into the blocking elements with lower manufacturing expense. In addition, the locking of the blocking elements 608A and 608B just described on the cap bolt 611 via the spring devices 609 and 610, in comparison with securing of the blocking elements on the cap bolts via separate fastening elements, also leads to a reduction in manufacturing costs, and also a simplification of assembly, since, in the solution depicted in FIG. 17 and FIG. 18, the number of parts is limited, and the locking of the blocking elements on the cap bolts is produced in a single assembly step, in which the spring devices 609 and 610 are pushed over the cap bolt 611 and locked.

The second catch device 606, in the present case, is formed by a surface 606B of the second module 5 or rollover element 6 that faces a blocking element 608A or 608B and is movable relative to the blocking element 608A, 608B corresponding to it, with which the tooth profile 607 of a blocking element 608A or 608B is in frictional engagement in the effective position of the first catch device 605, so that a movement of the second module 5 from a position deviating from the rest position into the direction of its rest position is prevented.

The spring devices 609 and 610, allocated to the blocking elements 608A and 608B, are each formed with blocking devices 610A, in which the blocking elements (608A and 608B), when the blocking device 610A is activated, can be held in a position equivalent to a deactivated state of the first catch device 605. For this purpose, the spring devices 609 and 610 are each designed with a first clip area 610B, which can be brought into effective connection with a second clip area 610C in the manner depicted in FIG. 18 for activation of the blocking devices 610A, so that the blocking elements 608A and 608B are held in the position that is equivalent to the deactivated state of the first catch device 605, in which a relative movement between the first module 4 and the second module 5 is not prevented by the locking device 600.

The spring devices 609 and 610 are inserted into slit-like recesses 612 of the blocking elements 608A and 608B with a first arm 610D, which is formed essentially U-shaped, and lie with their second arm 610E against the module 4 attached to the body, so that the spring devices 609 and 610 are in a biased position. Because of this biasing, the blocking elements 608A and 608B, in the deactivated state of the blocking devices 610A, are pivoted around the cap bolts 611 into their positions that are equivalent to the locking state of the first catch device 605.

The first clip areas 610B of the clip wire springs each represent an area that is adjacent to the middle area, i.e., the U-cross-arm of the clip wire springs that is inserted into the slit-like recess 612 of the blocking element, in which the first arm 610D of the clip wire springs is made with a larger width than the second clip area 610C on the congruent areas of the second arms 610E that are formed with two open clips.

The arms 610D and 610E of the spring devices 609 and 610 therefore form the blocking devices 610A, so that, in the deactivated state of the blocking devices 610A, they intersect and clamp behind one another in the area of the clip areas 610B and 610C, mutually hold each other and cannot separate, because of the internal bias, as is apparent in FIG. 18.

To release or deactivate the blocking devices 610A, spring devices 609 and 610, preferably in the form of clip wire springs, in the area of their free ends, are designed with clip ends 610E_1 and 610E_2, designed to be movable relative to one another in the manner further shown in FIG. 18. This means that the blocking devices 610A can each be deactivated or activated by increasing the spacing of the clip wire ends of the spring devices 609 and 610, so that the arms of the spring devices 609 and 610 can be passed by one another in the region of the clip areas 610B and 610C.

The blocking elements 608A and 608B are then either held in the non-blocking position by the blocking device 610A according to FIG. 18 and FIG. 19, or released to adjust the effective position of the first catch device 605 according to the position shown in FIG. 17.

When the blocking device 610A of the spring device 610, which is allocated to the blocking element 608B in FIG. 17, is deactivated, the blocking element 608B of the spring device 610 is pivoted around the cap bolt 611 into a position that corresponds to the active state of the first catch device 605. In this position of the blocking element 608B, a deployment movement of the second module 5 in the direction of its support position is permitted by the first catch device 605, but movement of the second module 5 in the direction of its rest position is effectively prevented by an effective connection between the tooth profile 607 of the blocking element 608B and the second catch device 606.

The bias force of the spring devices 609 and 610 in the direction of the active positions of the blocking elements 608A and 608B is prescribed in the present case, so that stopping of the blocking elements 608A and 608B on the catch device 606, formed here as a surface of the rollover element 6, does not prevent a deployment movement. The blocking elements 608A and 608B, representing toothed cams, are pivoted during the deployment movement of the rollover element 6 by this around the cap bolt 611 against the direction of rotation X and therefore exert no blocking effect between the two catch devices 605 and 606.

When the blocking element 608B is pivoted into its active position, the blocking element 608B, with its tooth profile 607 facing the locking surface 606B, penetrates into the locking surface 606B of the catch device 606, at least in areas, so that shape-mating is present between the blocking element 608B and the rollover element 6, and the rollover element 6 is securely held in the direction of its rest position against a retraction movement.

In the embodiment depicted in FIG. 8, FIG. 17, FIG. 18 and FIG. 19, the tooth geometry of the tooth profile 607 is designed with teeth having blade-like ends that taper to a point, and the material for the tooth profile 607 is harder relative to the material of the surface of the rollover element 6, in order to ensure a reliable locking of the rollover element 6.

Whereas only one deformation of the surface contacted by the blocking element is essentially provided here, as an alternative to this, an optionally elastic deformability of the tooth profile can be provided.

The rollover element 6 is formed on the bottom of its impact profile 16 with unlocking elements 19, having wedge surfaces 18 and formed, in the present case, as truncated pyramids, by means of which the blocking elements 608A, 608B, after a retraction movement of the rollover element 6 in the direction of its rest position, are engaged with the second catch device 606.

For a reversal into the initial position or rest position of the rollover element 6, the blocking elements 608A, 608B are retracted, in which the widened clip areas 610B of the spring devices 609 and 610 hook behind the free clip areas 610C and therefore eliminate the effect of the spring devices 609, 610. The rollover element 6 can therefore be lowered into its initial position. On reaching the rest position of the rollover element 6, the free spring clip ends 610E_1, 610E_2 are forced apart by the aforementioned unlocking elements 19 of the rollover element 6, so that the spring devices 609 and 610 bring the toothed cams or blocking elements 608A, 608B back against the locking surface 606B of the rollover element 6.

To increase the locking force of the locking device 600, the locking surfaces 606B, in the present case, are designed with a knurling or with a profiling that increases the friction coefficient of the locking surfaces.

In the present embodiment, the blocking elements are each mounted on a first module attached to the body, however a reverse arrangement with mounting on the deployable module and frictional engagement on a surface that is attached to the body can be provided.

In FIG. 20 to FIG. 22, a practical embodiment of the rollover protection system 1 is shown, in which not only do the deployable modules 4, 5 of the rollover protection devices 2, 3 attached to the body form a functionally capable preassembled component group outside of the vehicle, together with the holding device 210 and 310 or 410, the locking device 500 or 600 and the drive system 50, but the rollover protection devices 2, 3, allocated to a row of seats, also overall form a preassembled component group that can be fastened to the vehicle structure. For this purpose, the modules 4 of the rollover protection device 2, 3, attached to the body of the vehicle, are connected to one another by a transverse support 40.

As shown, in particular, from FIG. 22, the ends of the transverse support 40, in the present embodiment, are each formed with a profile 42 having undercuts 41, which profile corresponds, in terms of shaping, to a profile 44 of the tubular guide device 30 of the first module 4 attached to the body. The profiles 42 and 44 are then W-shaped or U-shaped relative to one another, so that the transverse support 40, with its U-profile 42, can be inserted into the W-profile 44 of the tubular guide device 30, so that the transverse support 40 is clamped in shape-mated fashion into the tubular guide device 30 and can optionally be secured by screw connections.

The transverse support 40 therefore forms a pre-installable unit from the rollover protection devices 2, 3, which can be screwed to the vehicle structure via its lateral holes 48.

In the embodiments depicted in FIG. 20 to FIG. 22, the first module 4 of the corresponding rollover protection device 2, 3, attached to the body of the vehicle, is designed with an integrated restraining belt system 100, in which a belt winder 110 is inserted in a known design in a profile area 35 of the tubular guide device 30 attached to the vehicle, mounted in front of the rollover element 6 in the vehicle front direction at middle height of the tubular guide device 30. The safety belt 112 is guided by this belt winder 110 in the profile area 35, designed as a hollow profile, to an upper safety belt guide or deflection 114. From there, the safety belt 112 extends, in the manner depicted in FIG. 21 and FIG. 22, in the vehicle forward direction over a backrest of a vehicle seat, mounted in front of the profile area 35 of the rollover protection device 2 or 3, and can be connected in the usual manner to a safety belt lock by a vehicle occupant.

In addition, the depicted restraining belt system 100 includes two upper anchoring points 120, 122 for a child safety seat restraining belt, in which one of the upper anchoring points 120 or 122 is allocated to the rollover protection device 2 or 3. The upper anchoring point 120, 122 is fastened to a profile wall 36 of the first module 4 attached to the body or the tubular guide device 30 that faces away from the vehicle interior and has a tab 124, through which a belt fastened to a child safety seat can be pulled or hooked in. The upper anchoring point 120 or 122 for a child safety seat, which is ordinarily attached at two fastening points in the seat base area, therefore forms a third fastening point.

As can be further gathered in the practical example depicted in FIG. 20 to FIG. 22, the rollover protection devices 2, 3 each have a seat connection device 150, which is designed, in the present case, with an upper and lower seat-back fastening pin 152 or 154.

The rollover protection system 1 according to the invention can therefore represent a multifunctional module, which can combine the functionalities of a rollover protection device, a pass-through opening, vehicle transverse stiffening, a restraining belt mount and a seat fastening, in which the entire multifunctional module can be completed in its proposed compact design separately outside of the vehicle and inserted in a vehicle for final assembly.

In addition to combining the functionalities described here, it is also conceivable for the multifunctional module to be part of a convertible cover for the cabriolet vehicle, or for a convertible top linkage to be connected to the component group having the rollover protection devices.

Assignment of the individual described components to the depicted practical example is only an example, so that any combination of the described components and their combination into a multifunctional module is possible.

While the best modes for carrying out the invention have been described in detail, those familiar with the art to which this invention relates will recognize various alternative designs and embodiments for practicing the invention within the scope of the appended claims.

The invention claimed is:

1. A rollover protection system for a vehicle having a body, the rollover protection system comprising:
    a first rollover protection device allocated to a first vehicle seat within a row of seats; and
    a second rollover protection device, separate from the first rollover protection device and allocated to a second vehicle seat within the row of seats,
    each of the rollover protection devices including:
        a first module mounted to the vehicle body;
        a second module having a rollover element which is movable between a lowered rest position and an elevated support position;
        a guide device provided on the first module and operable to allow the second module to translate with respect to the first module;
        a selectively releasable holding device operable to hold the second module in the rest position;
        a locking device operable to automatically support the second module in a position deviating from its rest position against a force acting in the direction of the rest position; and
        a drive system having a spring force accumulator operable to move the second module from the rest position in the direction of the support position;
    wherein the rollover elements of the first and second rollover protection devices are arranged directly on the first and second vehicle seats respectively, and each of the first and second rollover devices are arranged in opposite directions, off-center on an outboard side of the first and second seats respectively relative to the corresponding vehicle seat, wherein top ends of each rollover element are not connected to each other and are spaced apart from each other in a manner to enable a pass through opening between the first and second rollover protection devices.

2. The rollover protection system of claim 1, wherein the rollover element is bar-like in form and defines an axial receiving channel for the spring force accumulator; and wherein the guide devices of each of the first modules has a generally tubular profile and operates to guide the rollover element, wherein the guide device is sufficiently configured to accommodate at least one upper end area of the rollover element in the rest position and a lower end area of the rollover element in the support position.

3. The rollover protection system of claim 1, wherein the rollover element has a generally round cross section.

4. The rollover protection system of claim 1, wherein the rollover element is a generally straight bar.

5. The rollover protection system of claim 4, wherein the rollover element, on its upper end, has an impact profile with an impact surface that is enlarged relative to the cross-sectional surface of the rollover element.

6. The rollover protection system of claim 1, wherein the guide device has a generally tubular profile and is disposed with its lower edge relative to a foot element of the first module.

7. The rollover protection system of claim 6, wherein the guide device is connected to the foot element of the first module by a connection that is mounted laterally to the guide device.

8. The rollover protection system of claim 6, further comprising a catch device supported on the guide device.

9. The rollover protection system of claim 8, wherein the guide device defines a peripheral recess sufficiently configured to accommodate the catch device, the catch device being selectively held in shape-mated fashion against the guide device during movement of the rollover element.

10. The rollover protection system of claim 1, wherein the first module and the second module, the holding device, the locking device and the drive system form a functionally capable preassembled unit outside of the vehicle that can be attached to the vehicle body.

11. The rollover protection system of claim 1, wherein the first and second rollover protection devices, allocated to a row of seats, form a preassembled unit that can be mounted on the vehicle body, wherein the first and second rollover protection devices allocated to a row of seats are preferably connected by a transverse support.

12. The rollover protection system of claim 1, further comprising a seat connection device integrated into the first module.

13. The rollover protection system of claim 1, further comprising a restraining belt system with safety belt guides for at least one safety belt integrated into the first module.

14. The rollover protection system of claim 13, wherein the restraining belt system includes at least one upper anchoring point adapted for a child safety seat restraining belt.

15. The rollover protection system of claim 1, wherein the releasable holding device includes a locking element pivotably mounted about a fixed axis of rotation, wherein the locking element has a detent section for selective engagement with a mating element provided on the rollover element, and wherein the locking element is secured against rotation by a blocking element of an actuator, and in which the locking element is disk-like in configuration and defines with a peripheral recess, into which the blocking element engages when the rollover element is in the rest position, and with a peripheral stop, against which the blocking element, lies after rotation of the locking element to disengages the detent section from the mating element to transfer the rollover element into the support position.

16. The rollover protection system of claim 15, wherein the blocking element can be moved the axial direction by the actuator and wherein the blocking element is biased against the locking element by a spring.

17. The rollover protection system of claim 15, wherein the axis of rotation of the locking element is formed by a pin, wherein the pin is mounted on opposite sides of a base element, the sides of the base element being connected to one another by a cross-arm that forms a seat for the actuator.

18. The rollover protection system of claim 15, wherein the actuator is an electromagnetic actuator.

19. The rollover protection system of claim 1, wherein the releasable holding device includes a locking element pivotably mounted about fixed axis of rotation, wherein the locking element has a detent section for selective engagement with a mating element provided on the rollover element, and wherein the locking element is held in the rest position by a fusible insert of an actuator, which is meltable in the event of a accident.

20. The rollover protection system of claim 19, wherein the locking element is forced radially against a seat when the rollover element is in the rest position, and wherein the seat can be eliminated by melting the fusible insert.

21. The rollover protection system of claim 19, wherein the locking element is loaded radially in the rest position under tension and is connected to the base element via the fusible insert.

22. The rollover protection system of claim 21, wherein the locking element is lever-like having a first lever end forming a detent section for engagement with the mating element, and a mount disposed in the region of a second lever end for the fusible insert, which is connected to an energy supply device.

23. The rollover protection system of claim 22, wherein the locking element in the region of the first lever end has a slope running in the axial direction and is designed to be flexible, so that the locking element, during a reversal of the release of the rollover element by the mating element of the downward moving rollover element, can be deflected to a disengagement of the detent section.

24. The rollover protection system of claim 1, wherein the releasable holding device includes a locking element pivotably mounted with respect to a fixed axis of rotation, wherein the locking element has a detent section for engagement with a mating element provided on the rollover element, wherein the locking element is held in a stop position when the rollover element is in the rest position, and wherein the locking element is moved to a rotation position in the event of an accident by an actuator having a pyrotechnic propellant charge.

25. The rollover protection system of claim 1, wherein the locking device includes at least a first catch device effectively connectable to a second catch device to support the second module, wherein the first and second catch devices permit movement of the second module from the rest position in the direction of the support position, wherein the first catch device has a detent with a tooth profile and the second catch device being formed with a catch strip that is adapted to the geometry of the tooth profile of the first catch device, and in which the detent is spring-loaded in the direction of the catch strip.

26. The rollover protection system of claim 1, wherein the locking device has at least one first catch device effectively connectable to a second catch device to support the second module, wherein the first and second catch devices permit movement of the second module from the rest position in the direction of the support position, wherein one of the first and second catch devices is mounted to one of the first and second modules and has blocking elements mounted to rotate eccentrically around an axis of rotation and designed with a tooth profile, and wherein the other catch device is designed as a surface of the other module facing the blocking element, with which the tooth profile of the blocking element in its effective position is in frictional engagement, so that movement of the second module from a position deviating from the rest position in the direction of its rest position is prevented.

27. The rollover protection system of claim 26, wherein the blocking element, in its effective position, is engaged in shape-mated fashion with the surface based on a state of deformation in the region of the contacted surface.

28. The rollover protection system of claim 26, wherein a spring device is allocated to the blocking element, wherein the spring device is operable to bias the blocking element in the direction of the effective position, wherein the spring device and blocking element form a blocking device sufficiently configured to be held in a position that is equivalent to a deactivated state of the first catch device, in which the spring device preferably includes a clip wire spring, and the blocking device is designed with at least one first clip area effectively connectable to a second clip area of the spring device for activation of the blocking device.

29. The rollover protection system of claim 28, wherein the clip wire spring is arranged with a first arm in a recess defined by the blocking element and a second arm engaged with a module, wherein the spring device is in a biased position that pivots the detent around the cap bolts into a position that is equivalent to the activated state of the first catch device when the blocking device is deactivated.

30. The rollover protection system of claim 26, wherein the first catch device and the blocking element are mounted with respect to the first module and the second catch device is mounted with respect to the second module.

\* \* \* \* \*